(12) United States Patent (10) Patent No.: US 7,423,657 B2
Wada et al. (45) Date of Patent: Sep. 9, 2008

(54) IMAGE DISPLAY APPARATUS, IMAGE DISPLAY PROGRAM, IMAGE DISPLAY METHOD, AND RECORDING MEDIUM FOR RECORDING THE IMAGE DISPLAY PROGRAM

(75) Inventors: Toshiaki Wada, Tama (JP); Hiroto Nishiyama, Hino (JP)

(73) Assignee: Olympus Corporation, Tokyo (JP)

( * ) Notice: Subject to any disclaimer, the term of this patent is extended or adjusted under 35 U.S.C. 154(b) by 123 days.

(21) Appl. No.: 11/364,188

(22) Filed: Feb. 28, 2006

(65) Prior Publication Data

US 2006/0164441 A1 Jul. 27, 2006

Related U.S. Application Data

(63) Continuation of application No. PCT/JP2004/012911, filed on Aug. 31, 2004.

(30) Foreign Application Priority Data

Sep. 3, 2003 (JP) .............................. 2003-311913
Sep. 30, 2003 (JP) .............................. 2003-342419

(51) Int. Cl.
*G09G 5/00* (2006.01)

(52) U.S. Cl. ........................ 345/649; 345/440; 345/660

(58) Field of Classification Search ................. 345/440, 345/649, 660
See application file for complete search history.

(56) References Cited

U.S. PATENT DOCUMENTS

2004/0175764 A1 9/2004 Nishiyama et al.

FOREIGN PATENT DOCUMENTS

| CN | 1331454 | 1/2002 |
| JP | 02-203845 | 8/1990 |
| JP | 11-045334 | 2/1999 |

(Continued)

OTHER PUBLICATIONS

"Digital Steel Camera-Image File Format Standard: (EXIF) Version 2.1," Japan Electronic Industry Development Association, downloaded from: http://it.jeita.or.jp/document/publica/standard/exif/japanese/exifj.pdf>and http://it.jeita.or.jp/document/publica/standard/exif/English/Exife.pdf> (1998).

(Continued)

*Primary Examiner*—Kimbinh T Nguyen
(74) *Attorney, Agent, or Firm*—Straub and Pokotylo; John C. Pokotylo

(57) ABSTRACT

An operation input unit designates an image to be compared via a thumbnail image or the like. A photographing-information extracting unit extracts, from an image file of the image stored in an image memory, photographing information including the size and the number of pixels of CCD in an image pickup apparatus having captured the image, the distance to an object, and the focusing distance of an image pickup lens. A resizing processing unit automatically enlarges or reduces at least one image to be compared so as to set substantially the same display size of the same object included in a plurality of images, serving as comparison targets, on the basis of the photographing information and display information including resolution of a display, obtained from a display setting unit. A displaying control unit displays the resized image on the display.

88 Claims, 20 Drawing Sheets

FOREIGN PATENT DOCUMENTS

| | | |
|---|---|---|
| JP | 2000-185036 | 7/2000 |
| JP | 2000-298467 | 10/2000 |
| JP | 2002-049908 | 2/2002 |
| JP | 2002-209088 | 7/2002 |
| JP | 2002-374543 | 12/2002 |
| JP | 2004-215041 | 7/2004 |

OTHER PUBLICATIONS

Chinese First Notification of Office Action for Chinese Patent Application No. 200480025345.7, dated Apr. 4, 2008 (6 pgs.)(with partial translation 5 pgs.).

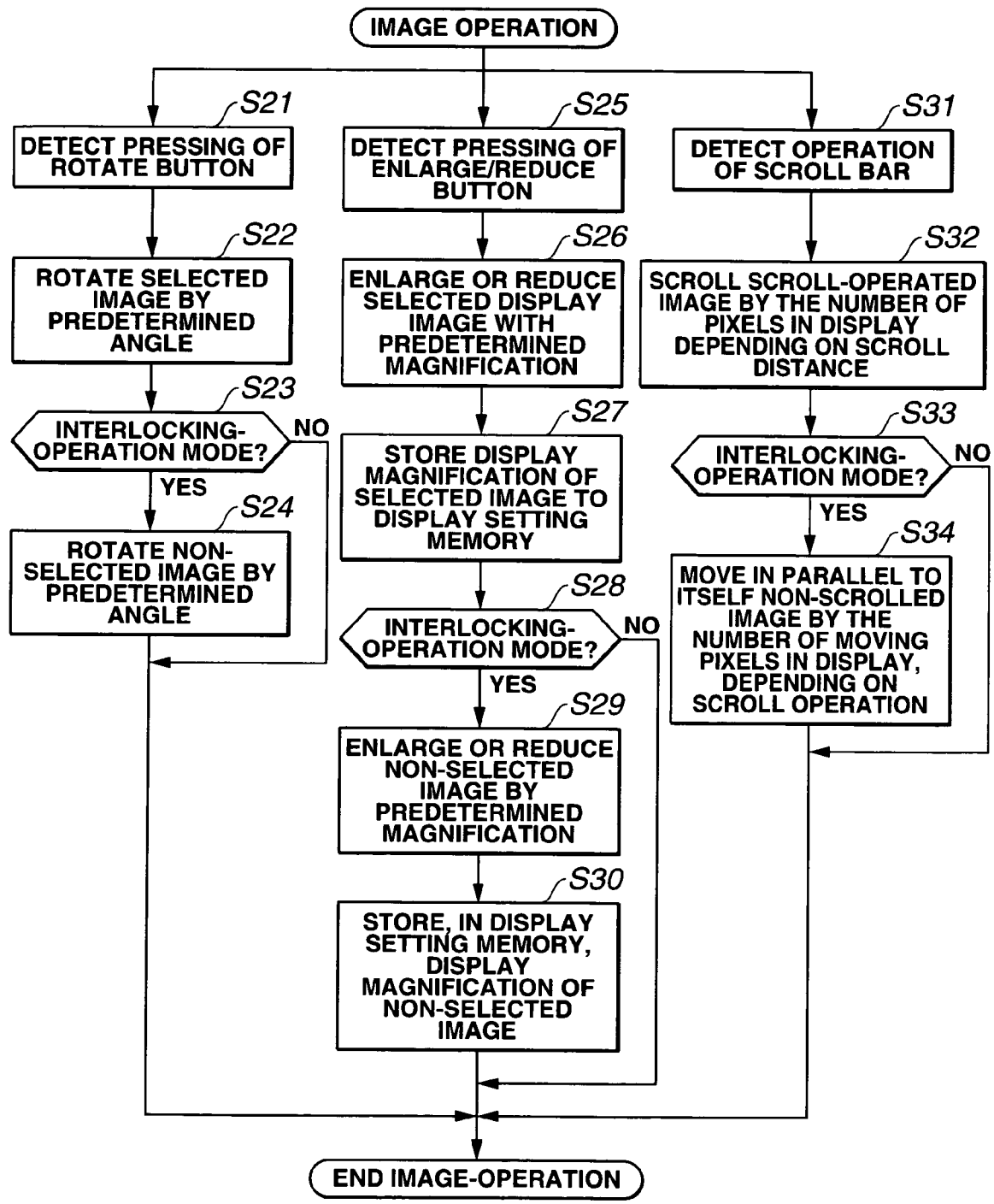

IMAGE DISPLAY APPARATUS, IMAGE DISPLAY PROGRAM, IMAGE DISPLAY METHOD, AND RECORDING MEDIUM FOR RECORDING THE IMAGE DISPLAY PROGRAM

CROSS REFERENCES TO RELATED APPLICATIONS

This application is a continuation application of PCT/JP04/12911 filed on Aug. 31, 2004 and claims the benefit of Japanese Applications No. 2003-311913 filed in Japan on Sep. 3, 2003, and No. 2003-342419 filed in Japan on Sep. 30, 2003, the entire contents of each of which are incorporated herein by their reference.

BACKGROUND OF THE INVENTION

1. Field of the Invention

The present invention relates to an image display apparatus, an image display program, an image display method, and a recording medium for recording the image display program.

2. Description of the Related Art

Recently, the development of the Internet increases the demand for showing an image on a homepage, and a digital camera for easily photographing a digital still image has been widely spread. Further, the digital camera improves its photography standing in the professional field including news photography and commercial photography as well as in the amateur field because an image can be sent to a newspaper company via communication without the development of the image, the development of an image pickup device having a large number of pixels enables the photographing of an image with the same precision as that of silver-halide photography, and the photo can be easily digital-processed.

Upon selecting the image photographed by the digital camera used for a post card by an amateur photographer, or selecting the image to be posted on a magazine by a professional photographer, similarly to a photo or film photographed by a silver-halide film camera, a plurality of images are arranged and are compared with each other.

As an example of the technology for the above comparison, Japanese Unexamined Patent Application Publication No. 11-45334 discloses an image display and comparing method comprising the steps of: displaying a plurality of images on a display apparatus on the basis of a plurality of sets of image data corresponding to the plurality of images; selecting any of the plurality of images as a reference image; setting a processing parameter for predetermined image processing of the reference image; executing the predetermined image processing of the reference image on the basis of the processing parameter and displaying on the display apparatus the image after the predetermined image processing; and executing the predetermined image processing of images excluding the reference image from the plurality of images on the basis of the processing parameter and displaying on the display apparatus the image after the predetermined image processing.

The operating efficiency on processing and comparing the selected plurality of images is improved by enlargement/reduction, movement, area cutting-out, and rotation while using the plurality of images arranged and displayed in interlocking therewith.

However, as disclosed in Japanese Unexamined Patent Application Publication No. 11-45334, the images cannot be easily compared by enlargement/reduction or movement while using the plurality of images in interlocking therewith. That is, in the comparison, various images are mixed, for example, the number of pixels (resolution) forming the image is varied, the photographing direction is varied, e.g., the image is photographed at the position in the longitudinal direction or the image is photographed at the position in the lateral direction, and the zooming factor of a photographing optical system in the photographing is varied. The display size of a main object is generally different in each of images when images are arranged and displayed. Therefore, even when the images are used in interlocking therewith and the images are enlarged, the enlargement is performed with different sizes of the main objects. The simple interlocking of images does not facilitate the comparison.

SUMMARY OF THE INVENTION

According to the present invention, an image display apparatus displays a plurality of images capable of being compared with each other on the basis of a plurality of pieces of image data obtained by photographing with the same or different photographing apparatuses. The image display apparatus comprises: an image selecting unit that selects as display targets the plurality of pieces of image data; an image geometric adjusting unit that geometrically adjusts the image displayed on the display on the basis of the image data selected by the image selecting unit; and a displaying control unit that displays, on the display, a plurality of images which are geometrically adjusted by the image geometric adjusting unit.

Further, according to the present invention, an image display program displays, on a display, a plurality of images capable of being compared with each other on the basis of a plurality of pieces of image data obtained by photographing operation of the same photographing apparatus or different photographing apparatuses. The image display program selects as display targets the plurality of pieces of image data, geometrically adjusts the image displayed on the display on the basis of the selected image data, and displays the plurality of geometrically-adjusted images on the display.

Furthermore, according to the present invention, a image display method displays, on a display, a plurality of images capable of being compared with each other on the basis of a plurality of pieces of image data obtained by photographing with the same or different photographing apparatuses. The image display method selects as display targets the plurality of pieces of image data, geometrically adjusts the image displayed on the display on the basis of the selected image data, and displays the plurality of geometrically-adjusted images on the display.

In addition, according to the present invention, a recording medium records an image display program to display, on a display, a plurality of images capable of being compared with each other on the basis of a plurality of pieces of image data obtained by photographing with the same or different photographing apparatuses. The recording medium for recording the image display program selects as display targets the plurality of pieces of image data, geometrically adjusts the image displayed on the display on the basis of the selected image data, and displays the plurality of geometrically-adjusted images on the display.

BRIEF DESCRIPTION OF THE DRAWINGS

FIG. 9 is a flowchart showing the details of an image operation processing shown in FIG. 7 according to the first embodiment;

DESCRIPTION OF THE PREFERRED EMBODIMENTS

Hereinbelow, embodiments of the present invention will be described with reference to the drawings.

First Embodiment

Figure 1:
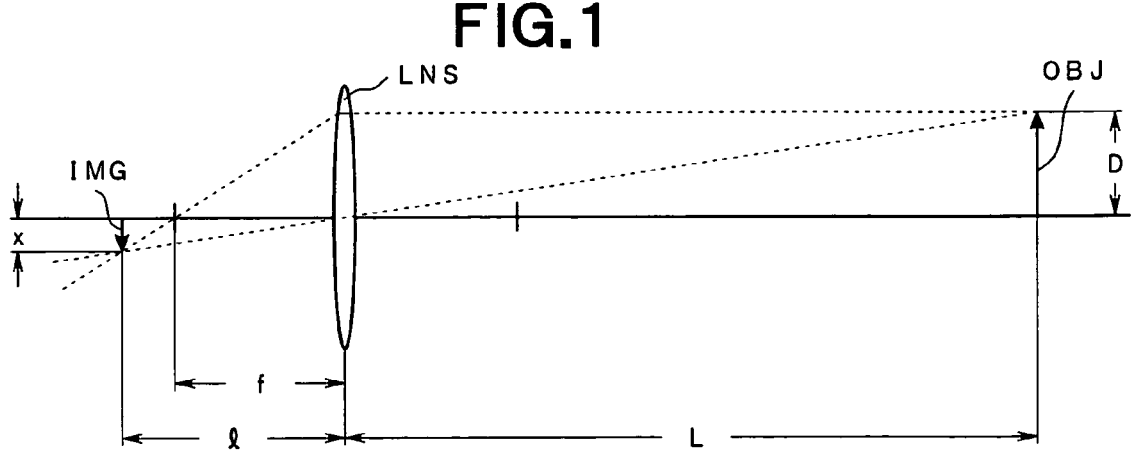
FIG. 1 is an explanatory diagram of a relationship between the size of an object and the size of an object image formed by a lens according to the first embodiment of the present invention.
Figure 2:
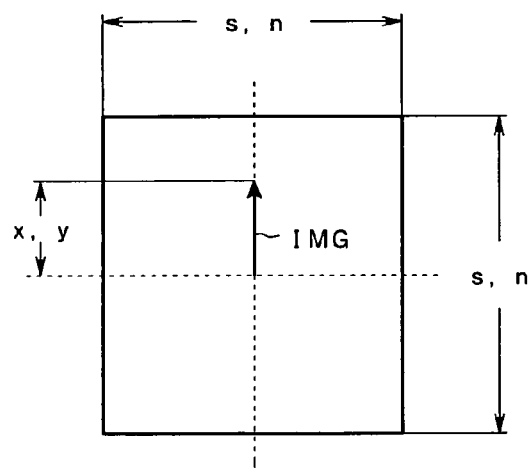
FIG. 2 is an explanatory diagram of a relationship between the size of an object image on a CCD and the number of pixels according to the first embodiment.
Figure 3:
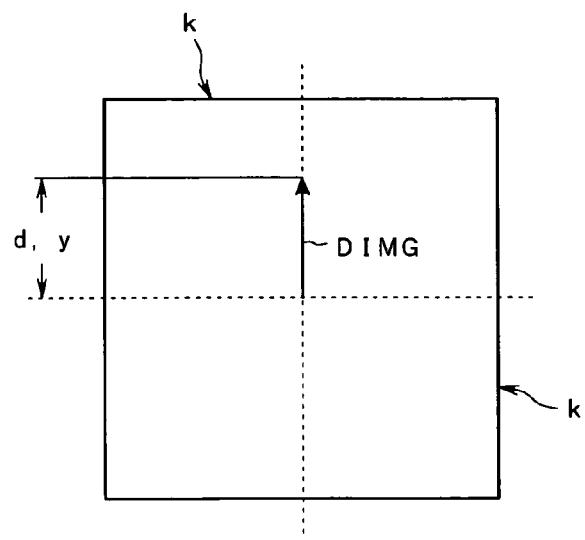
FIG. 3 is an explanatory diagram of a relationship between the size of an object image on a display and the number of pixels according to the first embodiment.

FIGS. 1 to 9 show the first embodiment of the present invention, FIG. 1 is an explanatory diagram of a relationship between the size of an object and the size of an object image formed by a lens, FIG. 2 is an explanatory diagram of a relationship between the size of an object image on a CCD and the number of pixels, and FIG. 3 is an explanatory diagram of a relationship between the size of an object image on a display and the number of pixels.

First, a description is given of the principle for displaying the same object included in a plurality of images with the same size on the display with reference to FIGS. 1 to 3.

Referring to FIG. 1, reference symbol f denotes a focusing distance of a lens LNS of an image pickup apparatus, reference symbol L denotes the distance from the lens LNS to an object OBJ, and reference symbol "l" denotes the distance from the lens to an object image IMG. On the basis of the lens formula, the following Expression 1 of the above parameters is established.

$$\frac{1}{f} = \frac{1}{L} + \frac{1}{l}$$ [Expression 1]

Further, reference symbol D denotes the size (length) (cm) of the object OBJ, and reference symbol x denotes the size (length) (cm) of the object image IMG. Geometrically, the following Expression 2 is established.

$$\frac{D}{x} = \frac{f}{l-f}$$ [Expression 2]

The following Expression 3 is obtained by eliminating the parameter "l" from the Expression 2 by using the Expression 1.

$$x = \frac{f}{L-f} \cdot D$$ [Expression 3]

Next, referring to FIG. 2, reference symbol s denotes the length (cm) of one side of a CCD, and reference symbol n denotes the number of pixels in the direction of the one side of the CCD. In this case, the number of pixels per unit length of the CCD is n/s (pixel/cm). Therefore, by the following Expression 4, a number y (pixel) of pixels corresponding to the length x (cm) of the object image is given.

$$y = \frac{n}{s} \cdot x \qquad \text{[Expression 4]}$$

Further, referring to FIG. 3, reference symbol k denotes the resolution (pixel/cm) of the display. In this case, upon displaying one pixel in the image pickup operation corresponding to one pixel in the display operation, the length d (cm) in the display operation of the object image on the display is given by the following Expression 5.

$$d = \frac{y}{k} = \frac{n}{k \cdot s} \cdot \frac{f}{L-f} \cdot D \qquad \text{[Expression 5]}$$

The Expression 5 denotes the length d when the object with the length D (cm) is captured via the lens LNS and an image pickup device and is displayed on the display.

A description is given of the case of simultaneously displaying a plurality of images on the same display apparatus or different display apparatus so as to enable the comparison of the plurality of images on the basis of a plurality of pieces of image data obtained by capturing images with the same image pickup apparatus or different image pickup apparatuses. Herein, a parameter of a first image is expressed by a subscript 1, and a parameter of a second image is expressed by a subscript 2.

In order to equalize, on the display operation, a length d1 (cm) on the display operation of the first image and a length d2 (cm) on the display operation of the second image, the first image is magnified by a magnification R1 and the second image is magnified by a magnification R2. In this case, a condition for equalizing the length d1 and the length d2 is expressed by the following Expression 6.

$$R_2 \cdot d_2 = R_1 \cdot d_1 \qquad \text{[Expression 6]}$$

The Expression 5 is applied to the Expression 6, thereby obtaining a relational expression between the magnification R1 and the magnification R2 as shown in Expression 7.

$$R_2 = \frac{n_1 \cdot k_2 \cdot s_2 \cdot f_1 \cdot (L_2 - f_2)}{n_2 \cdot k_1 \cdot s_1 \cdot f_2 \cdot (L_1 - f_1)} \cdot R_1 \qquad \text{[Expression 7]}$$

The Expression 7 includes the parameter added with the subscript 1 with respect to the first image and the parameter added with the subscript 2 with respect to the second image. The Expression 7 gives such the magnification R2 that the object is photographed by a first image pickup apparatus, the image is magnified by the magnification R1 on the display with a resolution k1 (pixel/cm), in this case, the same object is photographed by a second image pickup apparatus, the image is displayed on the display with a resolution k2 (pixel/cm) and, then, both the obtained images can be displayed with the same size.

Obviously, the relationship between the magnification R1 and R2 is obtained on the basis of: image pickup information substantially including sizes s1 and s2 in the longitudinal direction and/or lateral direction of image pickup devices in the image pickup apparatuses that capture both the images, numbers n1 and n2 in the longitudinal direction and/or lateral direction of the image pickup devices, focusing distances f1 and f2 of the lenses in the image pickup apparatuses in the photographing, and the distances L1 and L2 from the lenses to the object in the photographing; and display information substantially including display resolutions k1 and k2 in the longitudinal direction and/or lateral direction of the display apparatuses for displaying both the images.

In particular, upon displaying the first image and the second image on the same display apparatus or on different display apparatuses with the same resolution, the display resolution k1 is equal to the display resolution k2. The Expression 7 is simplified as shown in the following Expression 8.

$$R_2 = \frac{n_1 \cdot s_2 \cdot f_1 \cdot (L_2 - f_2)}{n_2 \cdot s_1 \cdot f_2 \cdot (L_1 - f_1)} \cdot R_1 \qquad \text{[Expression 8]}$$

In this case, obviously, the display information of the display apparatus does not influence on the relationship between the magnification R1 and the magnification R2.

Figure 4:
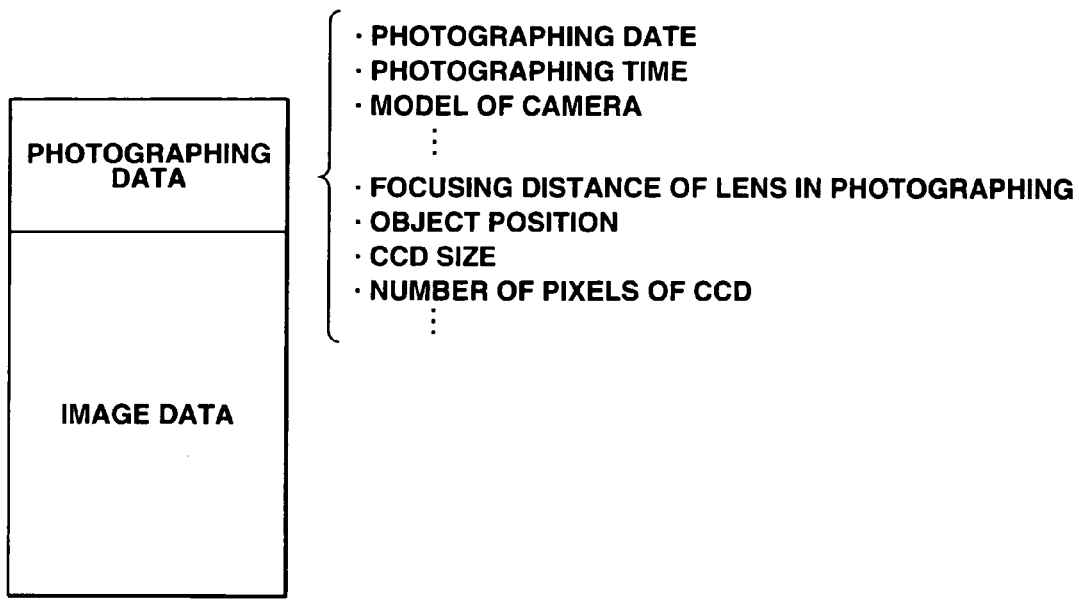
FIG. 4 is a diagram showing the configuration of an image file for storing image data according to the first embodiment.

FIG. 4 is a diagram showing the structure of an image file that stores the image data.

The image file stores the image data and further stores photographing data of the image data, e.g., as a header. Information included in the photographing data is photographing date, photographing time, and the type of a digital camera, serving as the image pickup apparatus. Further, the included information is data that enables the calculation using the above-described Expressions, i.e., the focusing distance of the lens in the photographing, the object position, the size of a CCD, serving as the image pickup device, and the number of pixels of the CCD.

Figure 5:
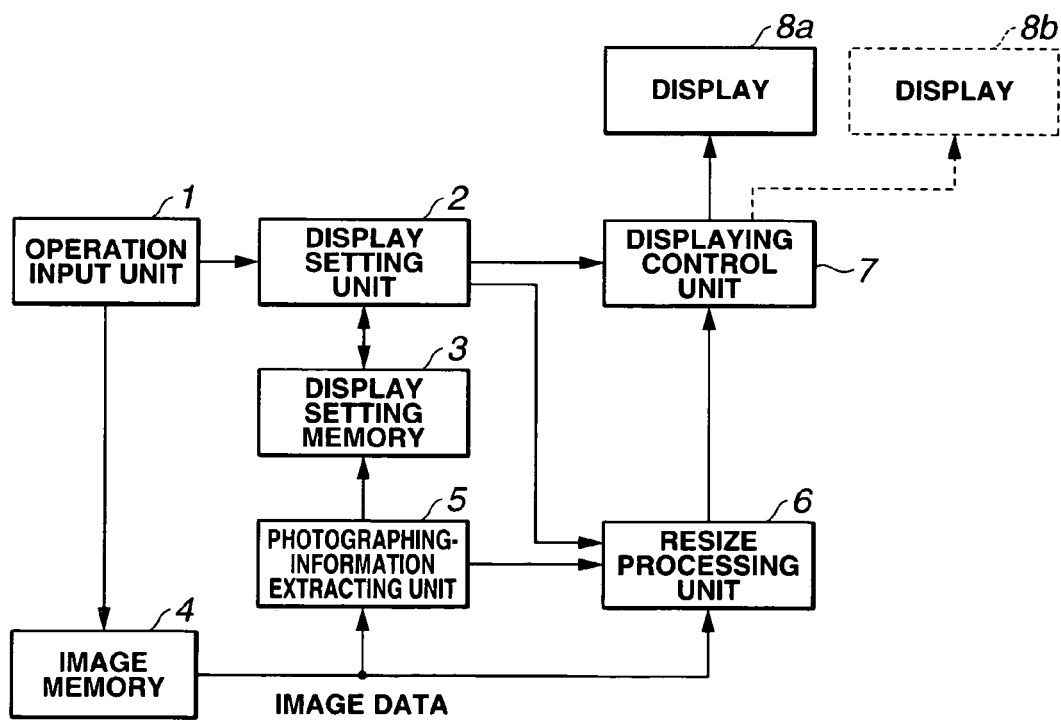
FIG. 5 is a block diagram showing the configuration of an image display apparatus according to the first embodiment.

FIG. 5 is a block diagram showing the configuration of an image display apparatus.

With the image display apparatus, a computer reads an image display program recorded on a recording medium, and executes the image display program. Therefore, referring to FIG. 5, the image display apparatus has functional blocks. However, the image display program is actually executed by a CPU, or is executed on the control operation of the CPU. Note that the present invention is not limited to this and a dedicated hardware may execute the same function. Alternatively, the image display method may be applied to an apparatus obtained by combining the existing devices, thereby executing the same function. Various recording media for recording the image display program can be used.

The image display apparatus comprises: an operation input unit 1, serving as an image selecting unit and an image-operation instructing unit, which inputs the operation by pointing and clicking an operating button displayed on a screen with a mouse; a display setting unit 2 that sets the display operation on the screen in accordance with the operation input from the operation input unit 1; a display setting memory 3 that stores a value set by the display setting unit 2 and further stores photographing information from a photographing-information extracting unit 5, as will be described later; an image memory 4, serving as an image storing unit, which stores an image file input by the downloading operation of the image pickup apparatus or via a memory card; the photographing-information extracting unit 5 that extracts the photographing information (photographing data) from the image file with a file structure shown in FIG. 4, stored in the image memory 4; a resize processing unit 6, serving as an image geometric adjusting unit and a resizing unit, which enlarges or reduces the image data extracted from the image file in the image memory 4 in accordance with the setting of the display operation unit 2; a displaying control unit 7, serving as an image operating unit and an interlocking-unit, which displays the image data after adjusting the size output from the resize processing unit 6 on displays 8a and 8b, as will be described later, in accordance with the setting of the display operation unit 2; and the displays 8a and 8b that display the image or a program screen under the control operation of the displaying control unit 7.

Note that the display may use the single display 8a only. Alternatively, the images may be displayed and may be compared by connecting a plurality of the displays 8a and 8b.

Figure 6:
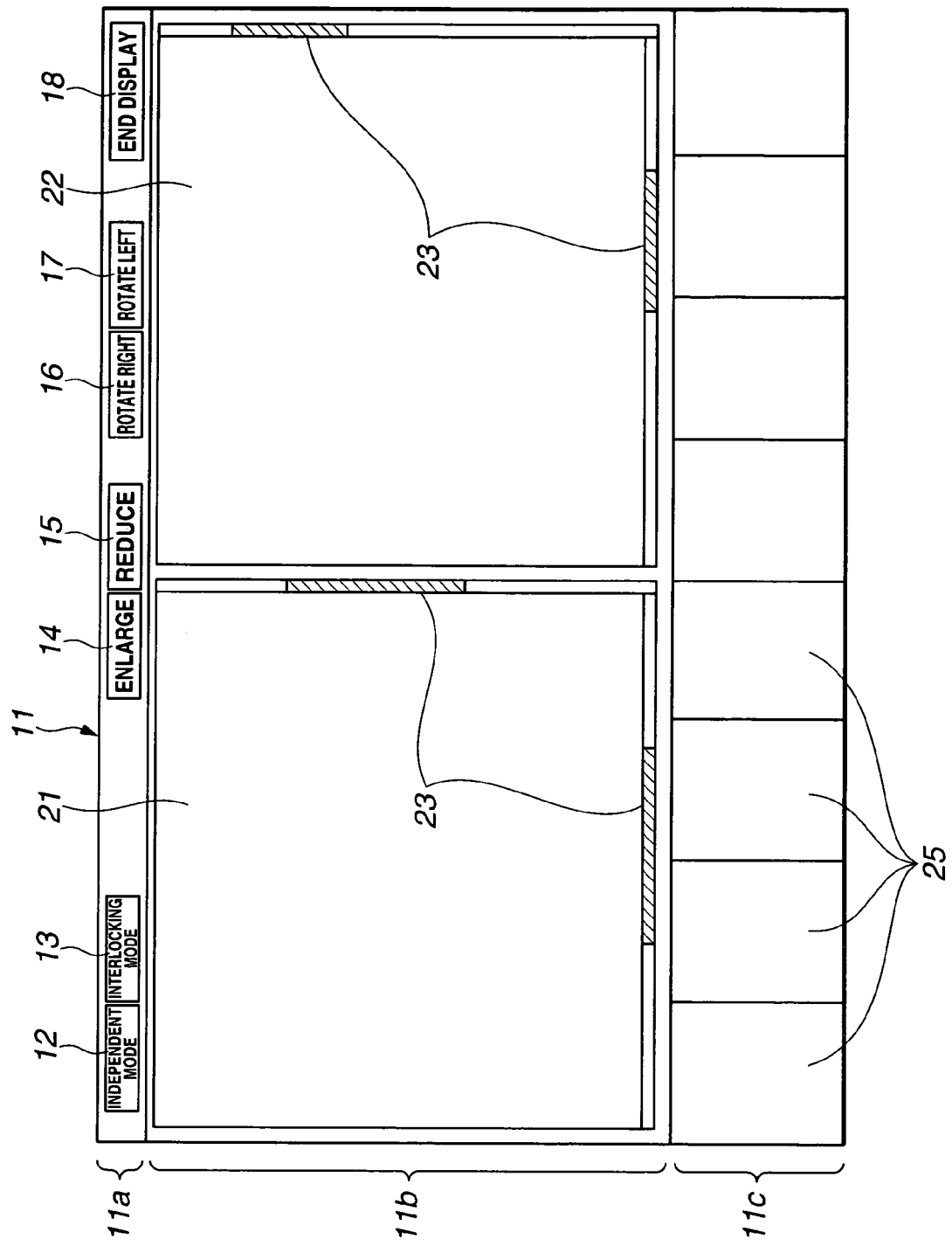
FIG. 6 is a diagram showing a screen of an image display program according to the first embodiment.

FIG. 6 is a diagram showing a screen of the image display program.

The screen indicates the image display program that is displayed, as one window, upon executing the image display program on a multi-window-type operating system having a graphic user interface.

A window 11 displays: an operating-button area 11a in which various operating buttons are arranged; a virtual-light box area 11b for arranging and displaying two images and comparing the two images; and a thumbnail area 11c for arranging and displaying a plurality of thumbnail images of the image file stored in the image memory 4.

The operating-button area 11a includes: an independent-operation button 12 that inputs an instruction for independently performing, every image, the operation of a plurality of images displayed in the virtual-light box area 11b; an interlocking operation button 13, serving as an interlocking-unit, which inputs an instruction for interlocking performing the operation of a plurality of images displayed in the virtual-light box area 11b; an enlarge button 14, serving as an image-operation instructing unit, which enlarges the image displayed in the virtual-light box area 11b; a reduce button 15, serving as an image-operation instructing unit, which reduces the image displayed in the virtual-light box area 11b; a right-rotate button 16, serving as an image-operation instructing unit, which rotates the image displayed in the virtual-light box area 11b in the right direction by, e.g., 90 degrees; a left-rotate button 17, serving as an image-operation instructing unit, which rotates the image displayed in the virtual-light box area 11b in the left direction by, e.g., 90 degrees; and a display end button 18 that ends the display operation of image.

In this case, the virtual-light box area 11b has two display areas for displaying the image, that is, display areas 21 and 22 arranged with the same size. When the display areas 21 and 22 display the images and the image sizes are over those of the display areas 21 and 22, a scroll bar 23 is displayed and a non-display portion can be scrolled and can be displayed.

Further, the thumbnail area 11c includes a plurality of display areas 25 for displaying thumbnail images of the image files stored in the image memory 4. Although not shown in FIG. 6, when the number of the image files stored in the image memory 4 is larger than the number of display areas 25, the scroll bar 23 is displayed as mentioned above and is scrolled, thereby displaying a necessary image.

Figure 7:
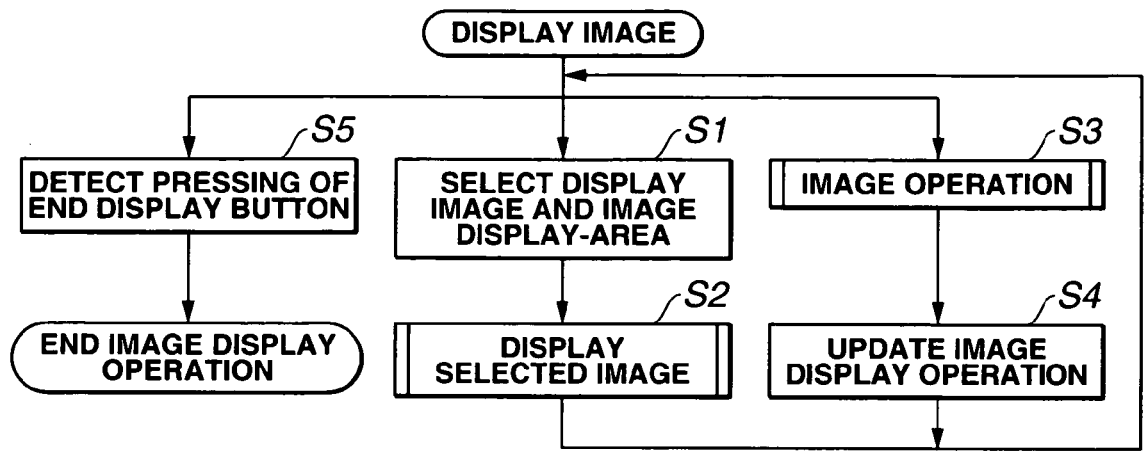
FIG. 7 is a flowchart showing the outline of the image display program processing according to the first embodiment.
Figure 8:
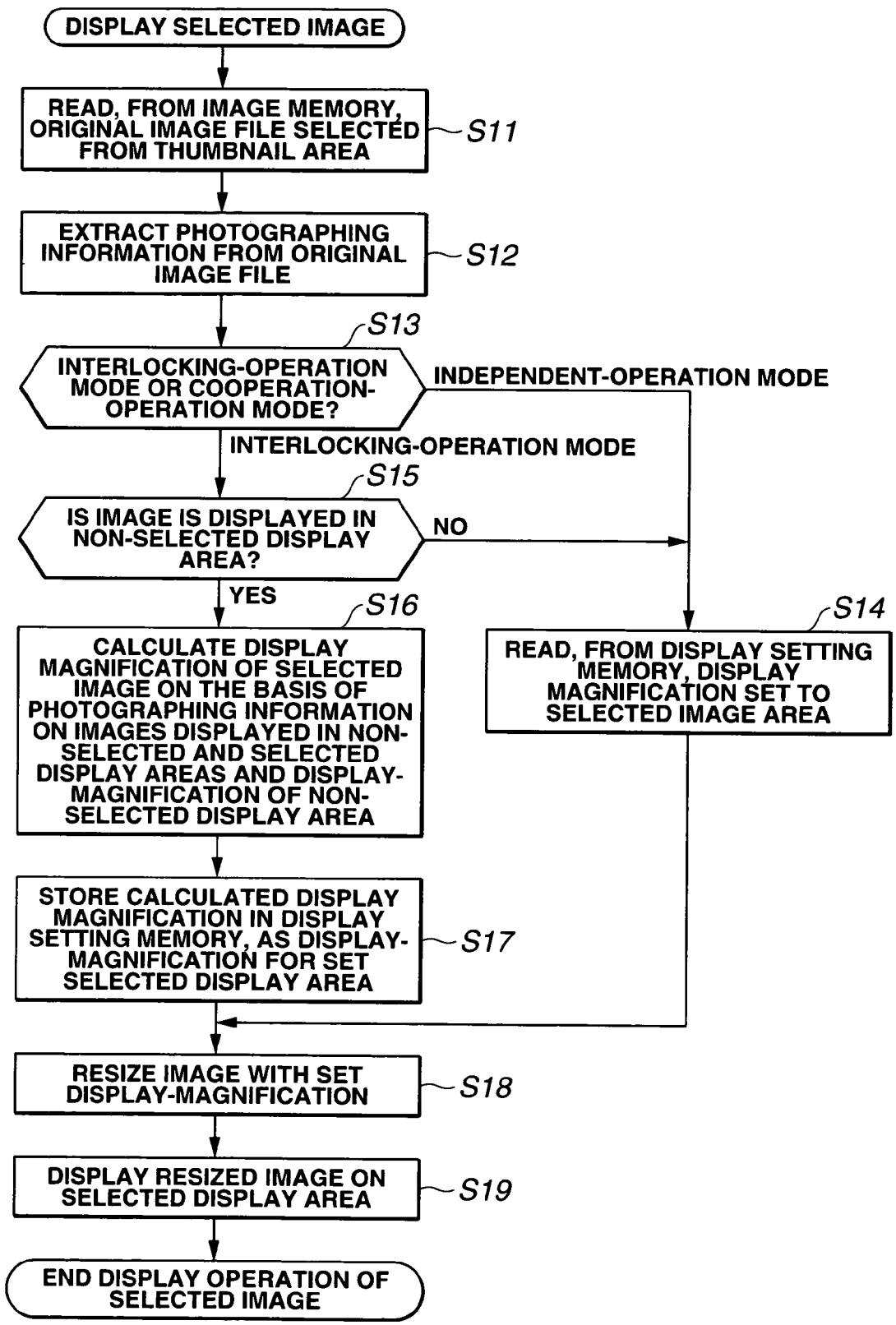
FIG. 8 is a flowchart showing the details of a selected image display processing shown in FIG. 7 according to the first embodiment.

Next, a description is given of the image display program processing with reference to FIGS. 7 to 9.

First, FIG. 7 is a flowchart showing the outline of the image display program processing.

The image display program starts and a screen is displayed as shown in FIG. 6. In this case, the thumbnail image in the image file stored in the image memory 4 is supposed to be displayed on the thumbnail area 11c. In this state, the program waits for the selection of the image and the operation of the operating buttons.

Herein, when the display image is selected by drag and drop operation of the image from the thumbnail area 11c to the display area 21 or the display area 22 and an area for displaying the selected image is selected (in step S1), the selected image display processing is performed (in step S2), which will be described later with reference to FIG. 8 and, after execution thereof, the program returns to the standby mode of various operations as mentioned above.

Upon inputting an instruction of the image operation with the enlarge button 14, the reduce button 15, the right-rotate button 16, or the left-rotate button 17, the image operation in accordance with the input of the instruction is performed, as will be described later with reference to FIG. 9 (in step S3). The image display operation in the display area 21 or/and the display area 22 is updated (in step S4), and the program returns to the standby mode of various operations as mentioned above.

Upon detecting the pressing operation of the display end button 18 (in step S5), the image display operation ends.

Next, FIG. 8 is a flowchart showing the details of the the selected image display processing shown in FIG. 7.

The display processing starts, and the original image file selected in the thumbnail area 11c is read from the image memory 4 (in step S11). The photographing information is extracted from the original image file (in step S12), the operating state of the independent-operation button 12 or the interlocking operation button 13 is detected, thereby determining whether the mode is the independent-operation mode or the interlocking operation mode (in step S13).

When it is determined in step S13 that the mode is the independent-operation mode, the display magnification set to the selected display area is read from the display setting memory 3 (in step S14).

When it is determined in step S13 that the mode is the interlocking operation mode, it is determined whether or not the image is displayed in the non-selected display area (in step S15). When it is determined in step S15 that the image is not displayed, the processing shifts to that in step S14.

When it is determined in step S15 that the image is displayed in the non-selected display area, the display magnification of the image displayed in the selected display area is calculated as shown in the Expression 8 on the basis of the photographing information on the image displayed on the non-selected display area, the photographing information on the image to be displayed in the selected display area, and the display magnification of the image displayed in the non-selected display area (in step S16).

The calculated display magnification is stored in the display setting memory 3, as the display magnification for setting the selected display area (in step S17).

After ending step S17 or S14, the resize processing unit 6 resizes the image displayed with the set display magnification (in step S18), and the resized image is displayed on the selected display area (in step S19).

Thereafter, the display operation of the selected image ends and the processing returns to that shown in FIG. 7.

Next, FIG. 9 is a flowchart showing the details of the processing of the image operation shown in FIG. 7.

The processing starts and the processing is branched depending on as which operation is instructed and is input.

First, it is detected which of the right-rotate button 16 and the left-rotate button 17 is operated (in step S21), and the selected image is rotated at a predetermined angle (in step S22). It is determined whether the mode is set to the interlocking operation mode or the independent-operation mode (in step S23).

When it is determined that the mode is the interlocking operation mode, the non-selected image is rotated at the predetermined angle (in step S24). When it is determined that the mode is the independent-operation mode, the processing of the image operation ends and returns to that shown in FIG. 7.

It is detected which of the enlarge button 14 and the reduce button 15 is operated (in step S25) and the selected image is enlarged or is reduced at a predetermined magnification (in step S26). The display magnification of the selected image is stored in the display setting memory 3 (in step S27).

It is determined whether the mode is set to the interlocking operation mode or the independent-operation mode (in step S28). When it is determined that the mode is set to the interlocking operation mode, the non-selected image is enlarged or is reduced at the predetermined magnification (in step S29). The display magnification of the non-selected image is stored in the display setting memory 3 (in step S30). When it is determined that the mode is the independent-operation mode, the processing of the image operation ends and returns to that shown in FIG. 7.

Further, when it is detected that the scroll bar 23 is operated (in step S31), the image scrolled with the number of display pixels corresponding to the scroll distance is scrolled (in step S32). It is determined whether the mode is set to the interlocking operation mode or the independent-operation mode (in step S33).

When it is determined that the mode is set to the interlocking operation mode, the image without the scroll operation is moved in parallel to itself, with the number of moving pixels for display operation in accordance with the scroll operation (in step S34). When it is determined that the mode is set to the independent-operation mode, the processing of the image operation ends and returns to that shown in FIG. 7.

In the above description, the geometric operation of the image includes, as examples, the parallel movement, enlargement/reduction, and rotation of the image. However, the present invention is not limited to this and the geometric operation of the image may further include the inverse and the cut-out operation. For any of the above-described geometric operation, the independent operation and the cooperation operation can be performed.

According to the first embodiment, upon arranging and displaying a plurality of images on the same display apparatus for the purpose of comparison, the images can be automatically processed such that the size of the same object is equal in the images on the basis of the photographing information of the images. Therefore, a plurality of images can be preferably compared without troublesome operation. In this case, the photographing information includes the information on the image pickup apparatus and, therefore, the image pickup apparatuses having photographed the images can be different.

Second Embodiment

Figure 10:
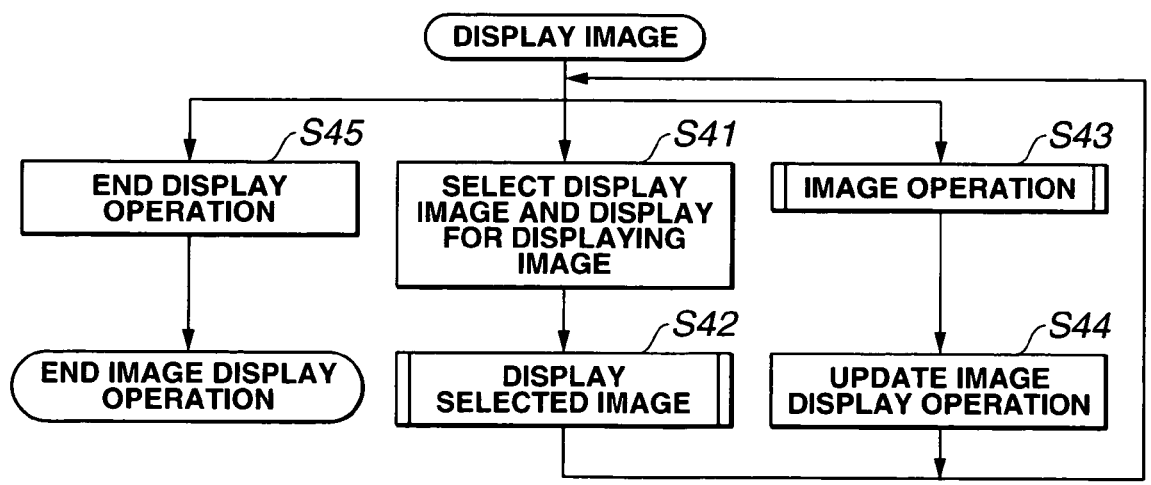
FIG. 10 is a flowchart showing the details of an image display program processing according to a second embodiment of the present invention.
Figure 11:
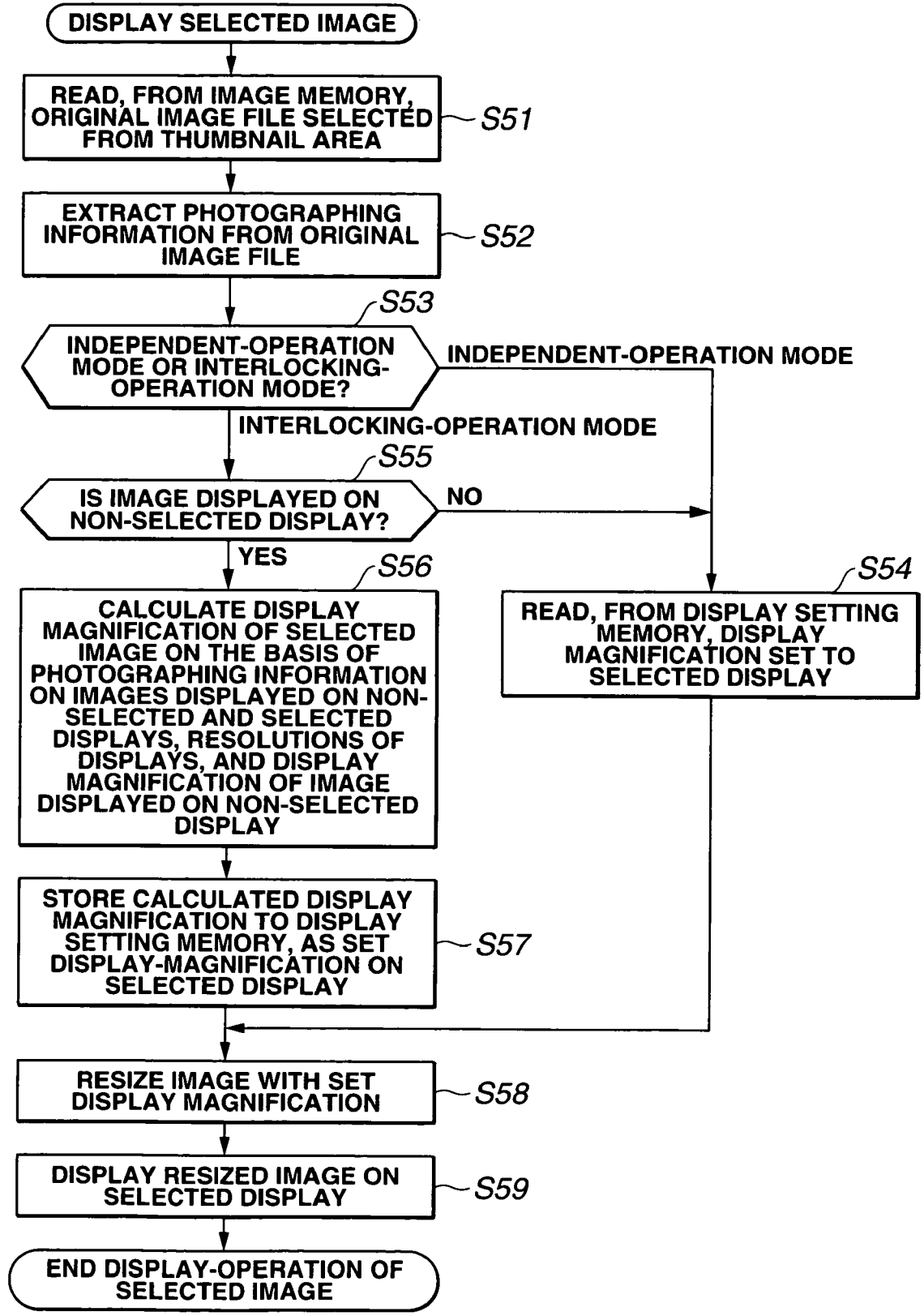
FIG. 11 is a flowchart showing the details of a selected image display processing shown in FIG. 10 according to the second embodiment.
Figure 12:
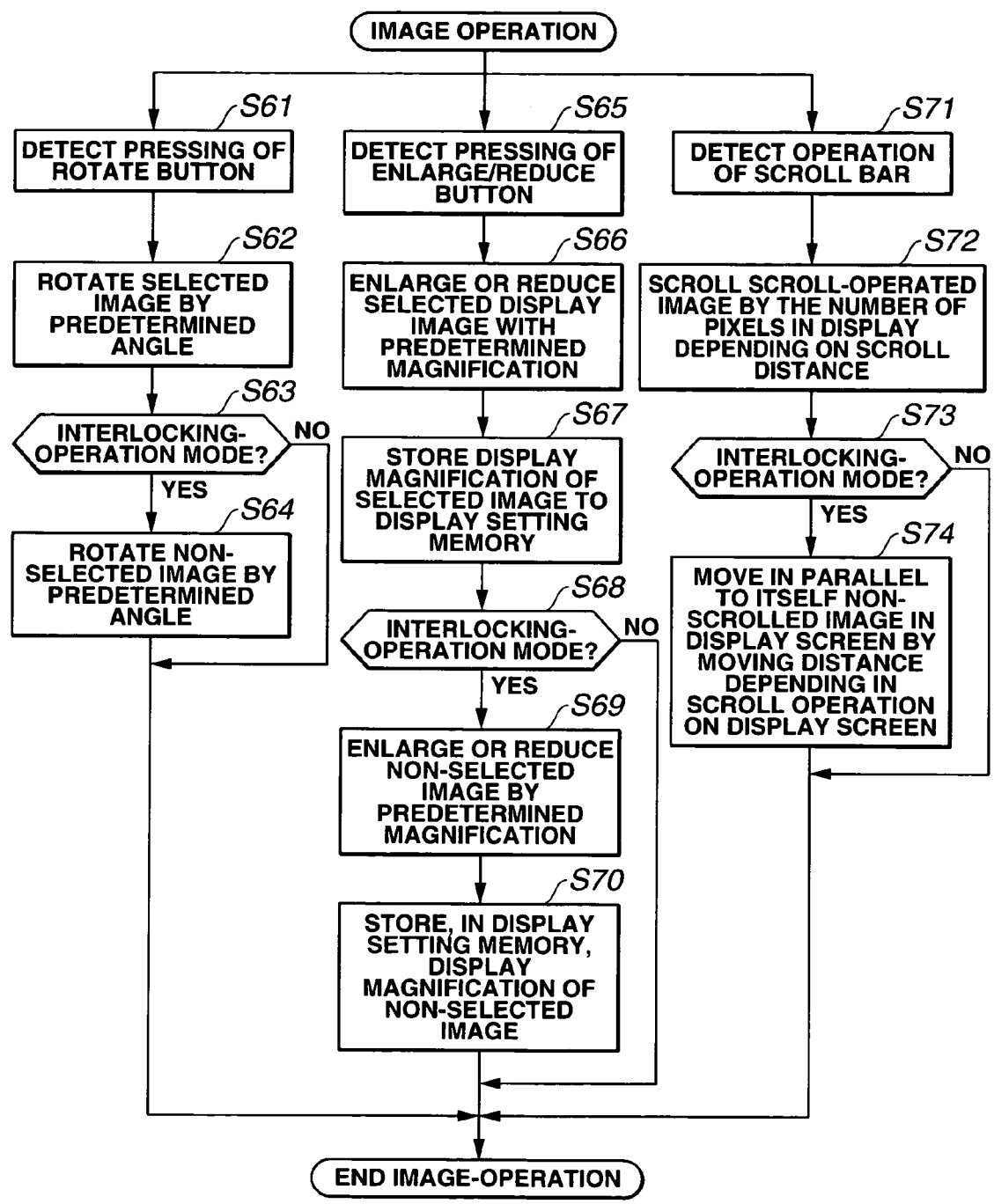
FIG. 12 is a flowchart showing the details of an image operation processing shown in FIG. 10 according to the second embodiment.

FIGS. 10 to 12 show the second embodiment of the present invention, and FIG. 10 is a flowchart showing the outline of the image display program processing.

According to the second embodiment, the same portions as those according to the first embodiment are not described and, mainly, different points are described.

According to the second embodiment, an image, as a comparison target, is displayed on a different display. That is, one image, as a comparison target, is displayed on the display 8a and another image is displayed on the display 8b.

The processing shown in FIG. 10 starts and, similarly to the above statement, the processing waits for the selection of image and the operation by the operating buttons.

The display image is selected and the display for displaying the selected image is selected (in step S41). Display operation of the selected image is performed (in step S42), which will be described later with reference to FIG. 11. After execution thereof, the processing returns to the standby mode of various operations as described above.

Upon inputting an instruction of image operation with the enlarge button 14, the reduce button 15, the right-rotate button 16, or the left-rotate button 17, the image operation in accordance with the input of instruction is performed (in step S43), which will be described later with reference to FIG. 12. The image display operation on the display 8a or/and the display 8b is updated (in step S44), and the mode returns to the standby mode of various operations as mentioned above.

It is detected that the display end button 18 is pressed (in step S45), and the image display operation ends.

Next, FIG. 11 is a flowchart showing the details of the selected image display processing as shown in FIG. 10.

The display processing starts, and the original image file selected by the thumbnail area 11c is read from the image memory 4 (in step S51). The photographing information is extracted from the original image file (in step S52). It is determined, by detecting the operation mode of the independent-operation button 12 or the interlocking operation button 13, whether the mode is the independent-operation mode or the interlocking operation mode (in step S53).

When it is determined in step S53 that the mode is the independent-operation mode, the display magnification set to the selected display is read from the display setting memory 3 (in step S54).

When it is determined in step S53 that the mode is the interlocking operation mode, it is determined whether or not the image is displayed on the non-selected display (in step S55). When it is determined in step S55 that the image is not displayed on the non-selected display, the processing shifts to that in step S54.

On the other hand, when it is determined in step S55 that the image is displayed on the non-selected display, the display magnification of the image displayed on the selected display is calculated as shown by the Expression 7 on the basis of the photographing information of the image displayed on the non-selected display, the photographing information of the image displayed on the selected display, the resolutions of the displays, and the display magnification of the image displayed on the non-selected display (in step S56).

The calculated display magnification is stored, as the set display magnification of the selected display, in the display setting memory 3 (in step S57).

After ending step S57 or S54, the resize processing unit 6 resizes the image displayed with the set display magnification (in step S58), and displays the resized image on the selected display (in step S59).

Thereafter, the display operation of the selected image ends and the processing returns to the processing shown in FIG. 10.

FIG. 12 is a flowchart showing the details of the image operation processing shown in FIG. 10.

The processing starts, and is branched depending on the instructed and input operation.

Upon detecting which of the right-rotate button 16 and the left-rotate button 17 (in step S61), the selected image is rotated at a predetermined angle (in step S62). It is determined whether the mode is set to the interlocking operation mode or the independent-operation mode (in step S63).

When it is determined that the mode is set to the interlocking operation mode, the non-selected image is rotated at a predetermined angle (in step S64). When it is determined that the mode is set to the independent-operation mode, the image operation processing ends and returns to that shown in FIG. 10.

When it is detected which of the enlarge button 14 and the reduce button 15 is operated (in step S65), the selected image is enlarged or is reduced with a predetermined magnification (in step S66), and the display magnification of the selected image is stored in the display setting memory 3 (in step S67).

It is determined whether the mode is set to the interlocking operation mode or the independent-operation mode (in step S68). When it is determined that the mode is set to the interlocking operation mode, the non-selected image is enlarged or is reduced with the predetermined magnification (in step S69). The display magnification of the non-selected image is stored in the display setting memory 3 (in step S70). On the other hand, when it is determined that the mode is set to the independent-operation mode, the image operation processing ends and returns to the processing shown in FIG. 10.

Further, when it is detected that the scroll bar 23 is operated (in step S71), the image scrolled with the number of display pixels corresponding to the scroll distance is scrolled (in step S72). It is determined whether the mode is set to the interlocking operation mode or the independent-operation mode (in step S73).

When it is determined that the mode is set to the interlocking operation mode, the non-scrolled image is moved in parallel to itself by the moving distance on the display screen corresponding to the scroll operation (in step S74). When it is determined that the mode is set to the independent-operation mode, the image operation processing ends and returns to the processing shown in FIG. 10.

According to the second embodiment, the same advantages as those according to the first embodiment are obtained. Further, the display information in addition to the photographing information of the image is also used and, therefore, the display apparatus for displaying each image can be different.

Third Embodiment

Figure 13:
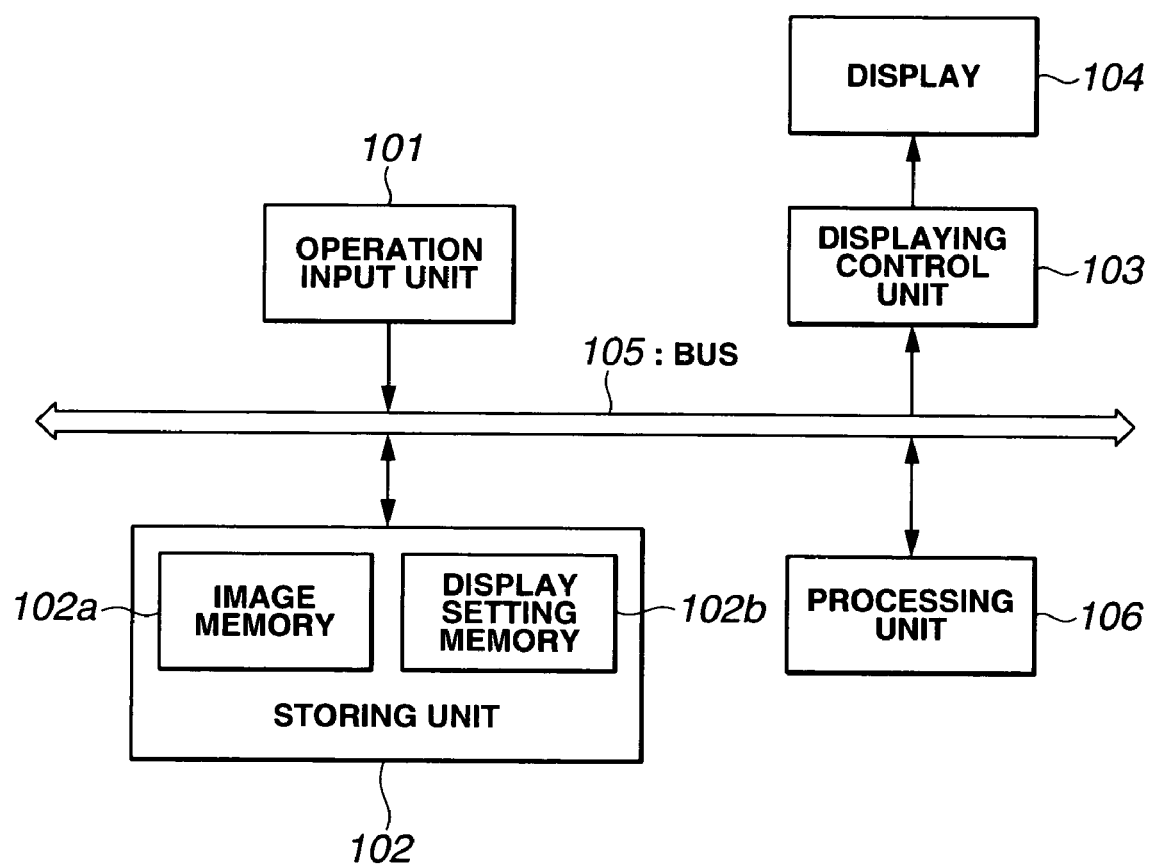
FIG. 13 is a block diagram showing the configuration of an image display apparatus according to a third embodiment of the present invention.

FIGS. 13 to 17 show the third embodiment of the present invention, and FIG. 13 is a block diagram showing the configuration of an image display apparatus.

With the image display apparatus according to the third embodiment, a computer reads an image display program recorded on a recording medium and executes the image display program. Therefore, referring to FIG. 13, the image display apparatus has functional blocks. However, the image display program is actually executed by a processing apparatus, e.g., a CPU or is executed by a peripheral device on the control operation of the CPU. Note that the present invention is not limited to this and a dedicated hardware may execute the same function. Obviously, the image display method may be applied to an apparatus obtained by combining existing devices, thereby executing the same function. Various recording media for recording the image display program can be used.

The image display apparatus according to the third embodiment comprises: an operation input unit 101, serving as an image selecting unit and a reference setting unit, which inputs the operation by pointing and clicking, with using a mouse, an operating button displayed on a screen of a display 104, as will be described later; a storing unit 102 including an image memory 102a, serving as an image storing unit, which stores an image file input by downloading operation from an image pickup apparatus, such as a digital camera, or input via a memory card and a display setting memory 102b that stores a value set by the operation input unit 101; a displaying control unit 103 that displays, on a display 104 which will be described later, the display image read-out from the image memory 102a in accordance with the operation input from the operation input unit 101 and processed by a processing unit 106; the display 104 that displays the image and a program screen under the control operation of the displaying control unit 103; the processing unit 106, serving as an image geometric adjusting unit, an image rotating section, a color/luminance distribution extracting section, and a rotating-angle determining section, which generates the display image from the original image in accordance with the operation input from the operation input unit 101 and performs various processing, such as enlargement/reduction and rotation, of the display image; and a bus 105 that connects the operation input unit 101, the storing unit 102, the displaying control unit 103, and the processing unit 106.

Figure 14:
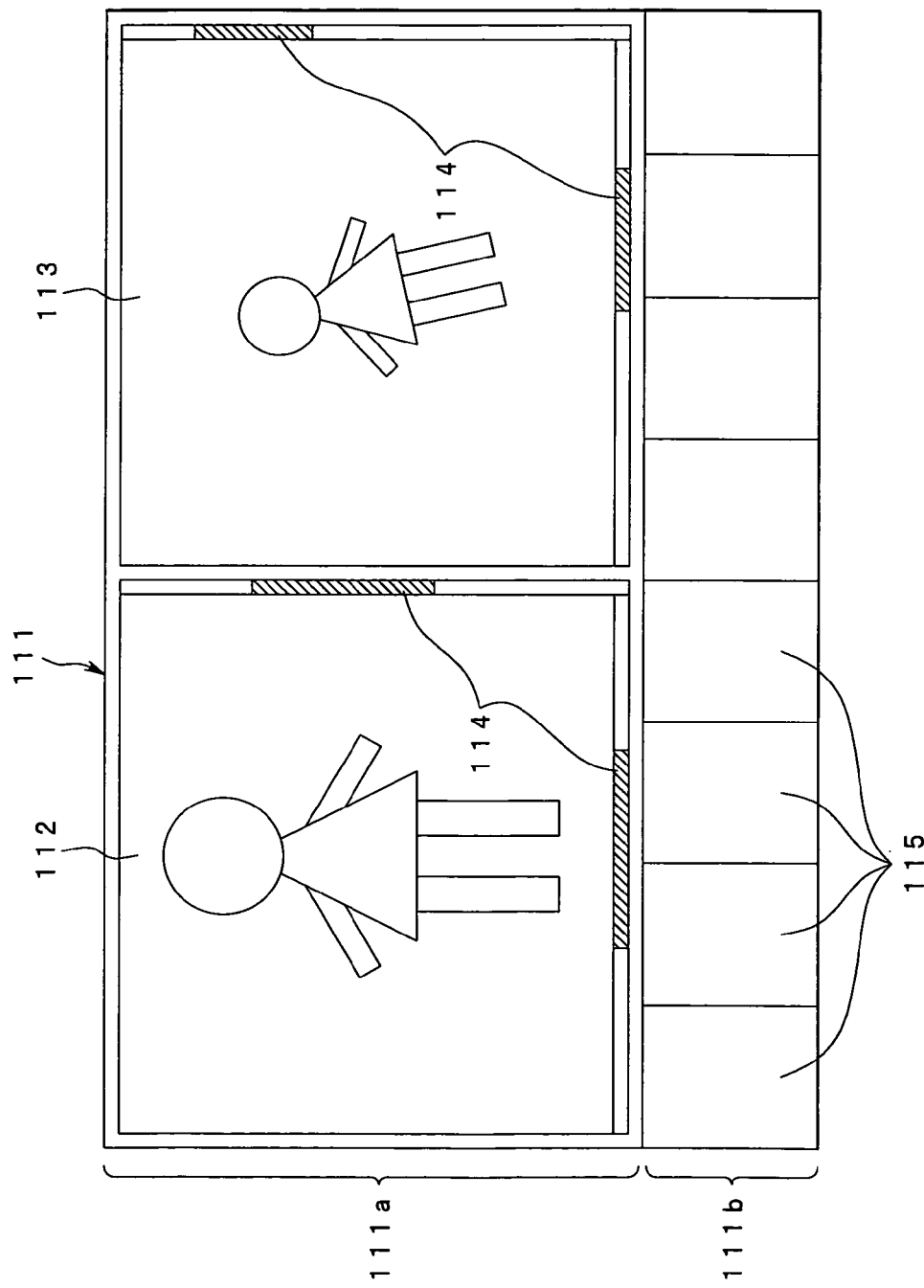
FIG. 14 is a diagram showing a screen of an image display program according to the third embodiment.

Next, FIG. 14 is a diagram showing a screen of an image display program.

The screen shows the image display program displayed, as one window, upon executing the image display program on a multi-window-type operating system having a graphic user interface.

A window 111 comprises: a virtual-light box area 111a that displays and compares two images; and a thumbnail area 111b that arranges and displays a plurality of thumbnail images of the image file stored in the image memory 102a.

The virtual-light box area 111a includes, in this case, two display areas that display images, i.e., display areas 112 and 113 with the same size. The display areas 112 and 113 can display a scroll bar 114 so as to be operable, the scroll bar 114 scrolling the image when the image is not within the display area.

Further, the thumbnail area 111b arranges and includes a plurality of display areas 115 that display the thumbnail images in the image file stored in the image memory 102a.

Figure 15A:
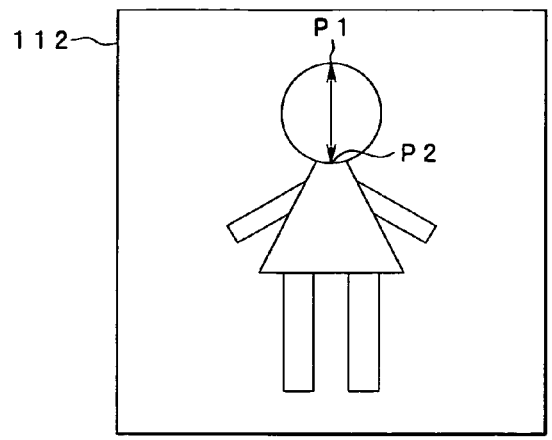
FIGS. 15A and 15B are explanatory diagrams of the operating sequence for setting sizes of main objects to be substantially the same in images displayed in a plurality of display areas according to the third embodiment.
Figure 15B:
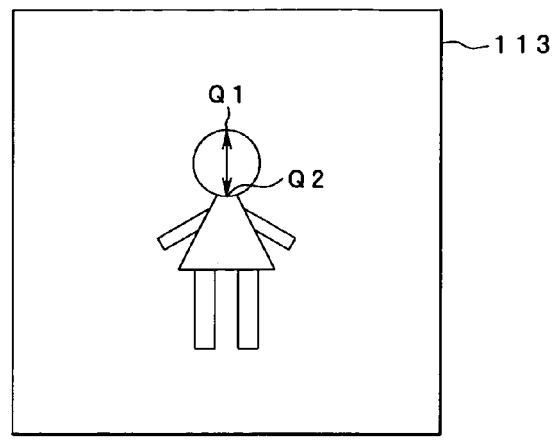
Figure 16:
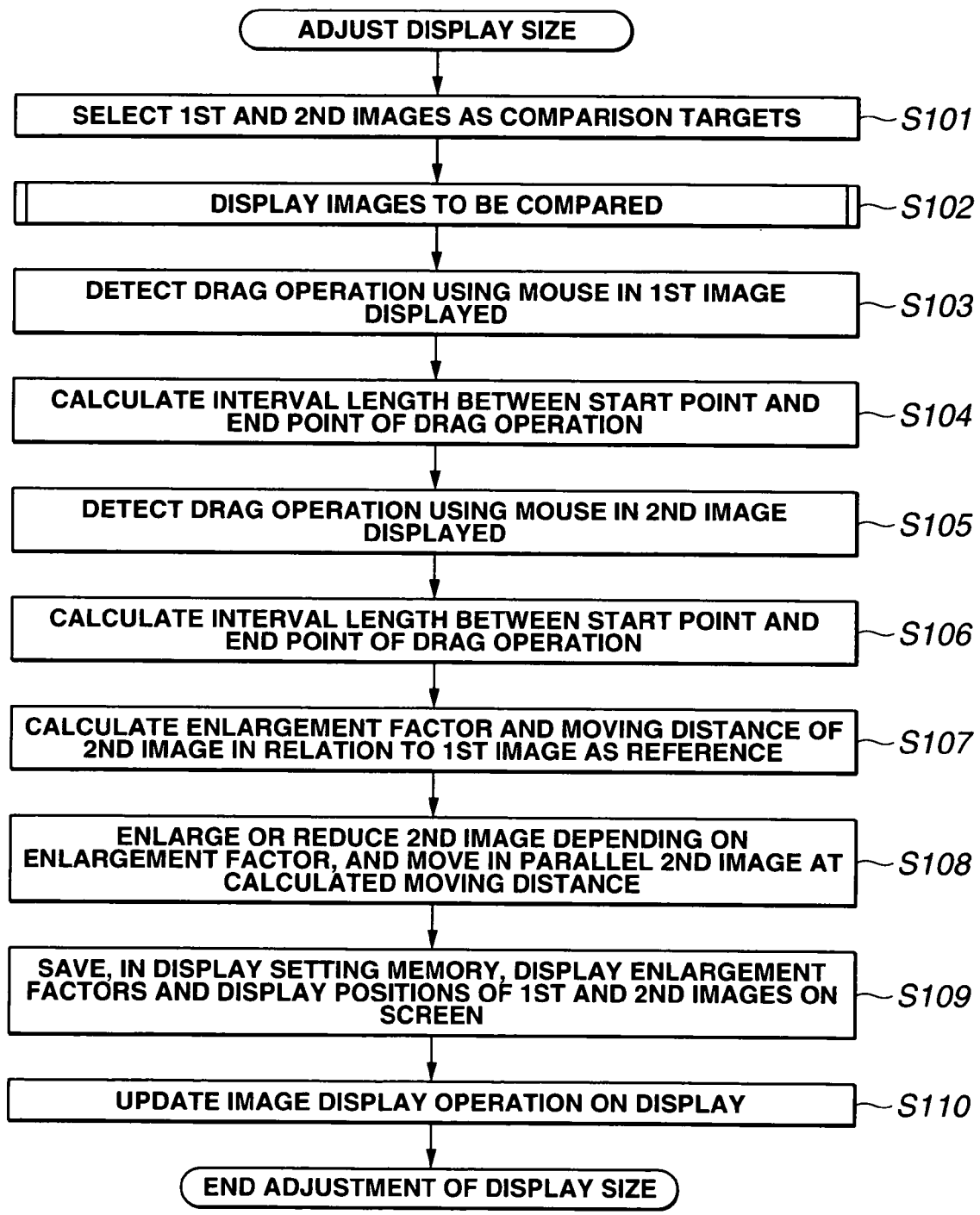
FIG. 16 is a flowchart showing the display size adjusting processing according to the third embodiment.
Figure 17:
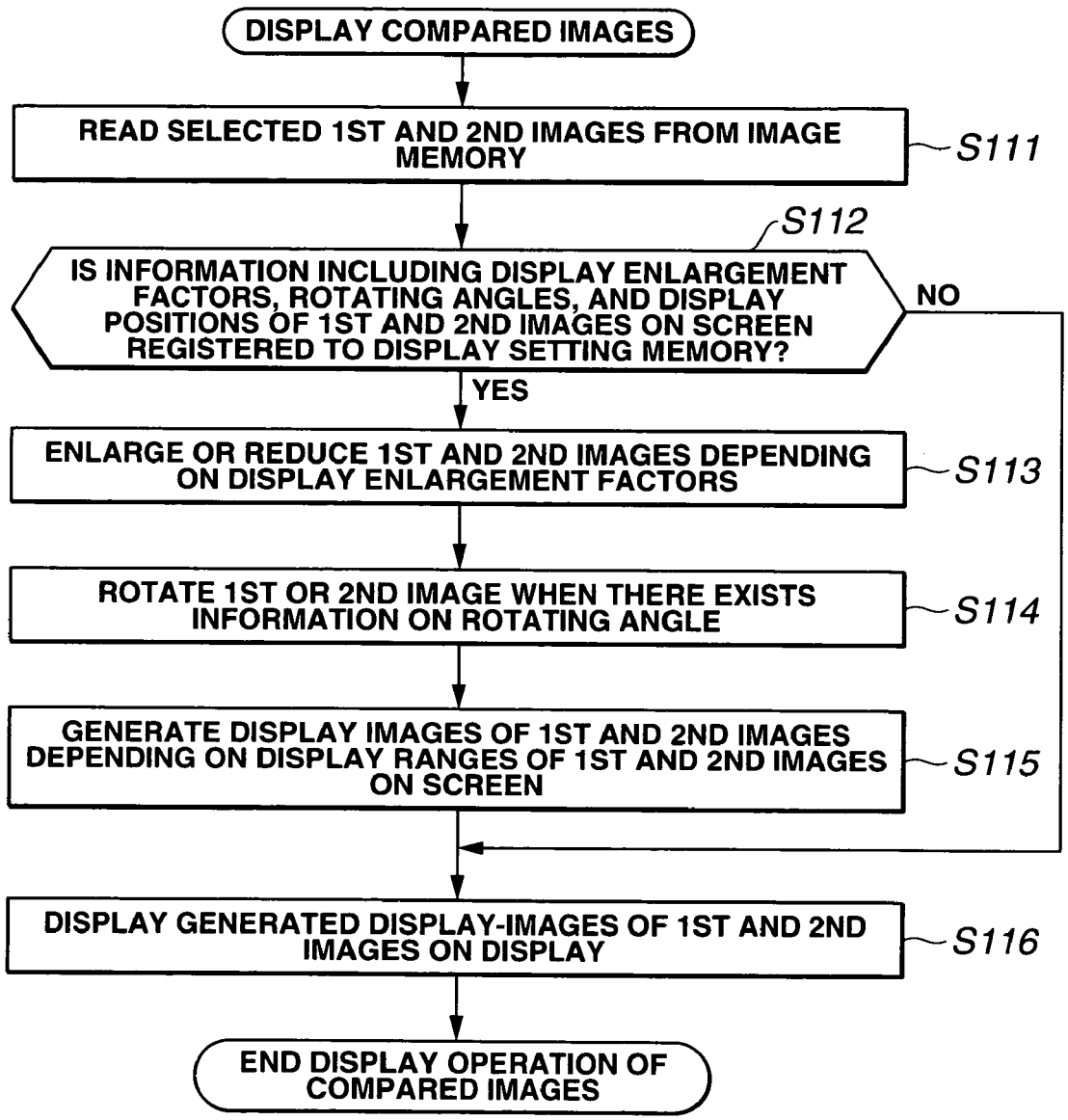
FIG. 17 is a flowchart showing the details of display processing of compared images shown in FIG. 16 according to the third embodiment.

FIGS. 15A and 15B are explanatory diagrams of the operating sequence for setting the same size of the main object in the images displayed in a plurality of display areas, FIG. 16 is a flowchart showing the processing for adjusting the image size, and FIG. 17 is a flowchart showing the details of display processing of compared images shown in FIG. 16.

Herein, a description is given of the sequence for which the size of the main object in the image shown in FIG. 15B is smaller than that in the image shown in FIG. 15A, and the images are adjusted such that the main object is displayed with the same size.

The display size adjusting processing starts and a first image and a second image are selected as comparison targets (in step S101). The first and second images are selected by drag and drop operation of the thumbnail images displayed on the thumbnail area 111b to any of the display areas 112 and 113 in the virtual-light box area 111a. The display image of the selected thumbnail image is displayed on the selected one of the display areas 112 and 113 (in step S102). The above operation is performed to both the display areas 112 and 113, thereby displaying the two images, as comparison targets.

Thereafter, it is detected that the drag operation with a mouse or the like is performed in one (the first image) of the two display images (herein, a description is given of the case in which the image displayed in the display area 112 is the first image) (in step S103). The interval length (distance on the screen where a mouse button is pressed and is simultaneously moved) between a start point P1 (designated by pressing the mouse button in the drag operation with the mouse) of the drag operation and an end point P2 (similarly, designated by releasing the mouse button) is calculated (in step S104).

Subsequently, it is detected that the drag operation with the mouse is performed in the other image (the second image) (image displayed in the display area 113 in the example) of the two display images (in step S105). Similarly, the interval length between a start point Q1 and an end point Q2 of the drag operation is calculated (in step S106).

On the basis of the first image, as a reference, an enlargement factor of the second image is calculated such that the interval length between the start point Q1 and the end point Q2 matches the interval length between the start point P1 and the end point P2, and the moving distance of the second image is calculated such that the start point Q1 after the enlarging or reducing processing matches the start point P1 and the end point Q2 after the enlarging or reducing processing matches the start point P2 (in step S107). As mentioned above, the second image is enlarged or is reduced, depending on the enlargement factor, and is moved in parallel to itself by the calculated moving distance (in step S108).

Thereafter, the enlargement factors for display and the display positions of the first image and the second image on the screen are stored in the display setting memory 102b (in step S109). The image display operation on the display 104 is updated (in step S110), and the display size adjusting processing ends.

Hereinbelow, a description is given of the display processing of the compared images in step S102 with reference to FIG. 17.

The processing starts, and the selected first and second images are read from the image memory 102a (in step S111). It is determined whether or not information, which includes the enlargement factor for display, the rotating angles, and the display positions on the screen of the first and second images, is registered in the display setting memory 102b (in step S112).

When it is determined in step S112 that the information is registered in the display setting memory 102b, the first image and the second images are enlarged or are reduced, depending on the registered enlargement factor for display (in step S113). Further, when it is determined that the information including the rotating angle is registered, the first image or the second image is rotated, depending on the rotating angle registered (in step S114).

Depending on the display ranges on the screen of the first image and the second image, the display images are generated from the first image and the second image which are enlarged or are reduced and are rotated (in step S115).

When the processing in step S115 ends, the display 104 displays the display images, generated in step S115, of the first image and the second image. When it is determined in step S112 that the information is not registered in the display setting memory 102b, the display 104 displays the display images, generated on the basis of predetermined initial values, of the first image and the second image (in step S116). The display operation of the compared images ends.

Note that the display area for displaying the image is not limited to the display area set on the same display screen, and may be set on a plurality of display screens with the same display characteristic (e.g., the same resolution).

In the above description, the comparison of the two images is exemplified. However, the present invention is not limited to this, and may be applied to the simultaneous comparison of three or more images. In addition, the reference image (as a reference image in the enlargement or reducing to match one image to another image) is not limited to the image in which the two points are first designated, and may be an image in which two points are finally designated. Alternatively, the reference image may be any of an image having a larger interval length between two points and an image having a smaller interval length between the two points.

Further, the setting of the main object with the same size is exemplified in the above case. However, the present invention is not limited to the main object and another object of the same in the images can be set with the same size. When the images do not have the same object, it is assumed that a virtual object exists with a predetermined length at a predetermined position and, in this case, the virtual objects can have the same size.

Further, the drag operation with the mouse designates the two points in the image. However, the two points in the image may be designated by two-time click operation at different positions in the image. Alternatively, various operation input methods can be widely used. In this case, preferably, a simple and easy operation-input method may be used.

According to the third embodiment, as mentioned above, with only the simple operation by designating the two points in the display image, the length of a line segment for connecting the two points can be set as the reference length. The object included in the two images can be observed with the same size. Thus, a plurality of images can be preferably compared.

Fourth Embodiment

Figure 18A:
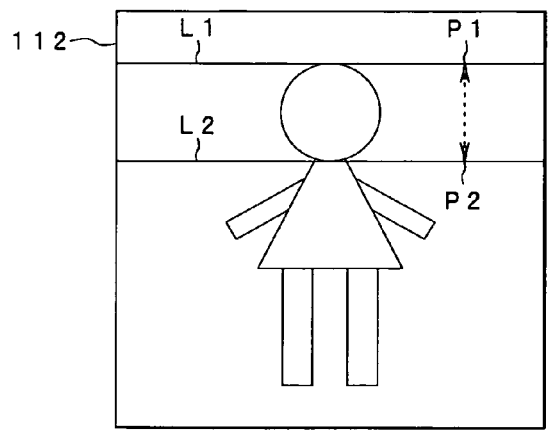
FIGS. 18A and 18B are explanatory diagrams of the operating sequence for setting sizes of main objects to be substantially the same in images displayed in a plurality of display areas according to a fourth embodiment of the present invention.
Figure 18B:
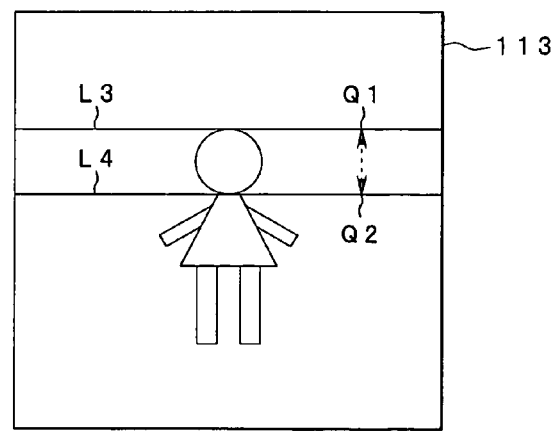
Figure 19:
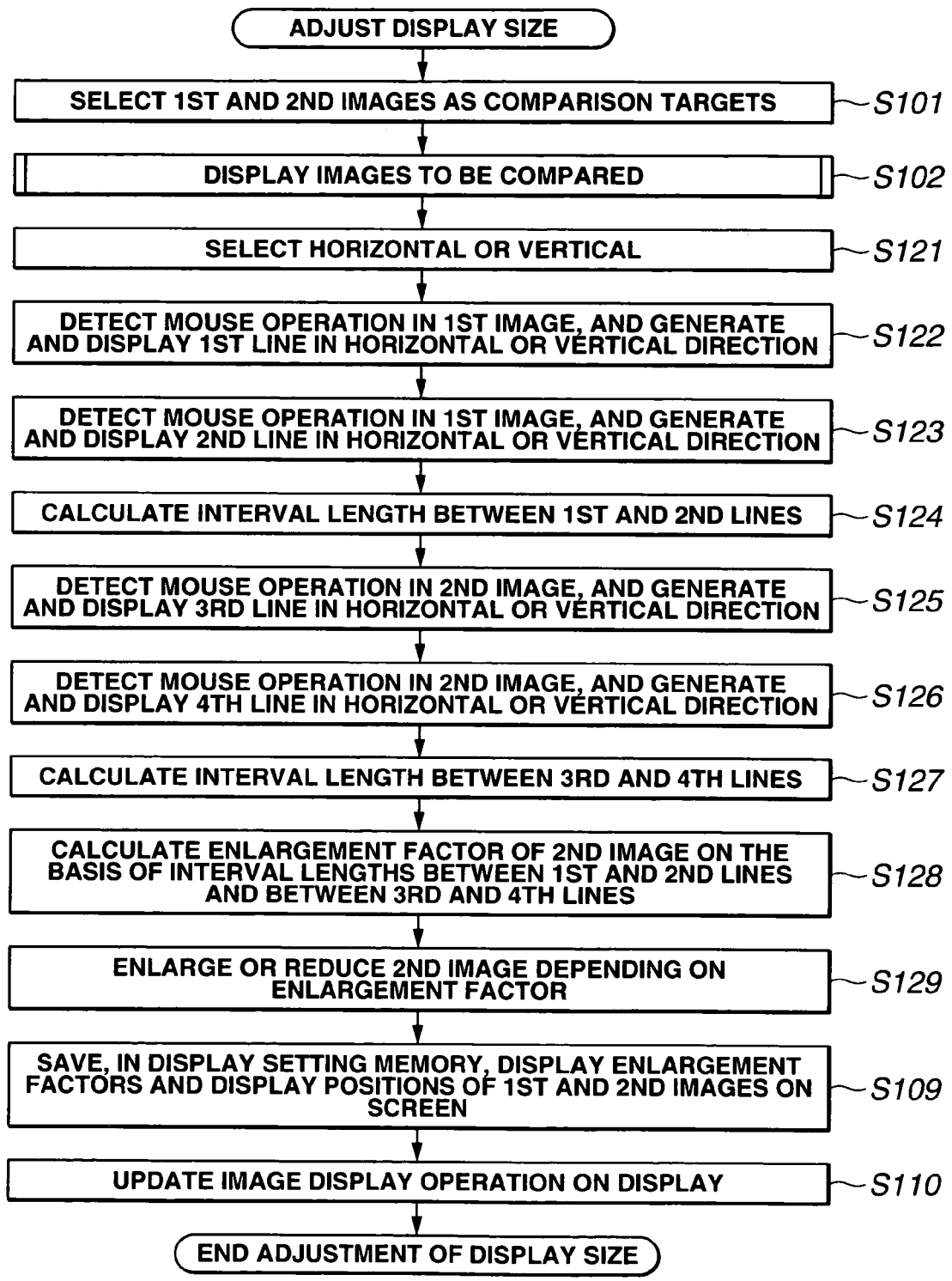
FIG. 19 is a flowchart showing the display size adjusting processing according to the fourth embodiment.

FIGS. 18A and 18B and 19 show the fourth embodiment of the present invention, FIGS. 18A and 18B are explanatory diagrams of the operating sequence for setting the same size of the main object in the images displayed in a plurality of display areas, and FIG. 19 is a flowchart showing display size adjusting processing.

According to the fourth embodiment, the same portions as those according to the third embodiment are designated by the same reference numerals, a description thereof is omitted, and only different portions are mainly described.

According to the fourth embodiment, a description is given of an example in which the size of the main object of an image shown in FIG. 18B is smaller than an image shown in FIG. 18A.

The display size adjusting processing starts and, the processing in steps S101 and S102 is performed as mentioned above, thereby selecting the first image and the second image, serving as comparison targets, and displaying the selected first and second images on the display areas 112 and 113.

Thereafter, a horizontal line (line parallel with the lateral side of a rectangular display region) or a vertical line (line parallel with the longitudinal side of the rectangular display region) is selected (in step S121). It is detected that the mouse operation (e.g., pressing operation with a mouse button in the drag operation) is performed at a point P1 in one (the first image) of the two display images. Subsequently, a first line L1, as the selected one of the horizontal line and the vertical line, passing through the point P1, is generated and is displayed (in step S122). Specifically, the pressing operation of the mouse button displays the horizontal line at the position of the mouse pointer, and the horizontal line is moved in the up and down direction on the screen in accordance with the drag operation of the mouse. The releasing operation of the mouse button fixes the horizontal line at the releasing position.

Subsequently, it is detected that the operation (similarly, operation for releasing the mouse button) with the mouse is performed at a point P2 in the first image. After that, a second line L2 parallel with the first line L1, passing through the point P2, is generated and is displayed (in step S123).

The distance (interval length) between the first line L1 and the second line L2 is calculated (in step S124).

Subsequently, it is detected that the operation with the mouse is performed at a point Q1 in the other display image (the second image). In this case, a third line L3 parallel with the first line L1, passing through the point Q1, is generated and is displayed (in step S125).

Similarly, it is detected that the operation with the mouse is performed at a point Q2 in the second image. In this case, a fourth line L4 parallel with the first line L1, passing through the point Q2, is generated and is displayed (in step S126). Note that the fixing sequence of the positions of the lines L2 to L4 is the same as that of the position of the line L1.

Subsequently, the distance (interval length) between the third line L3 and the fourth line L4 is calculated (in step S127).

An enlargement factor of the second image is calculated on the basis of the interval length between the first line L1 and the second line L2, calculated in step S124, and the interval length between the third line L3 and the fourth line L4, calculated in step S127 (in step S128). The second image is enlarged or is reduced, depending on the enlargement factor (in step S129).

After that, the processing in steps S109 and S110 is executed and the display size adjusting processing ends.

According to the fourth embodiment, the same advantages as those according to the third embodiment are obtained. Further, with only the simple operation by designating two parallel lines in the display image, the distance between the two parallel lines can be set as a reference length. The object included in the two images can be observed with the same size. As a consequence thereof, a plurality of images can be preferably compared.

Further, the two parallel lines can designate the positions thereof every line with the independent operation. Therefore, it is possible to perform the positioning operation with high precision and to improve the precision for designating the length on the screen, determined depending on the interval between the parallel lines.

Fifth Embodiment

Figure 20A:
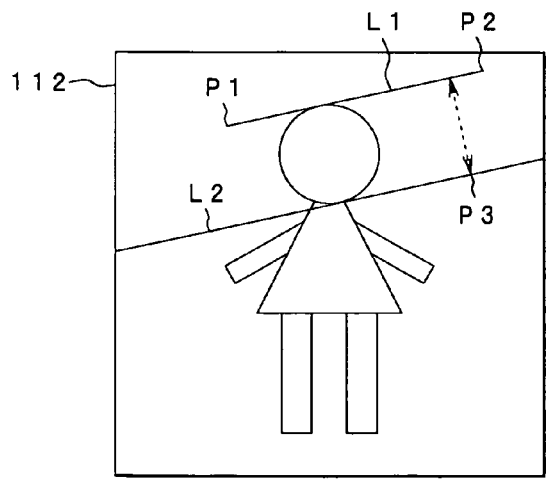
FIGS. 20A and 20B are explanatory diagrams of the operating sequence for setting sizes of main objects to be substantially the same in images displayed in a plurality of display areas according to a fifth embodiment.
Figure 20B:
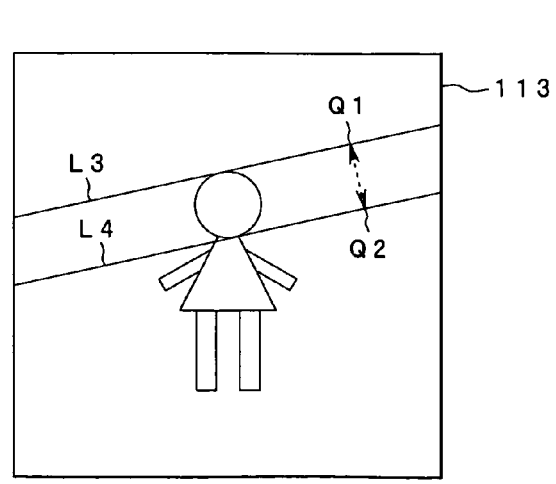
Figure 21:
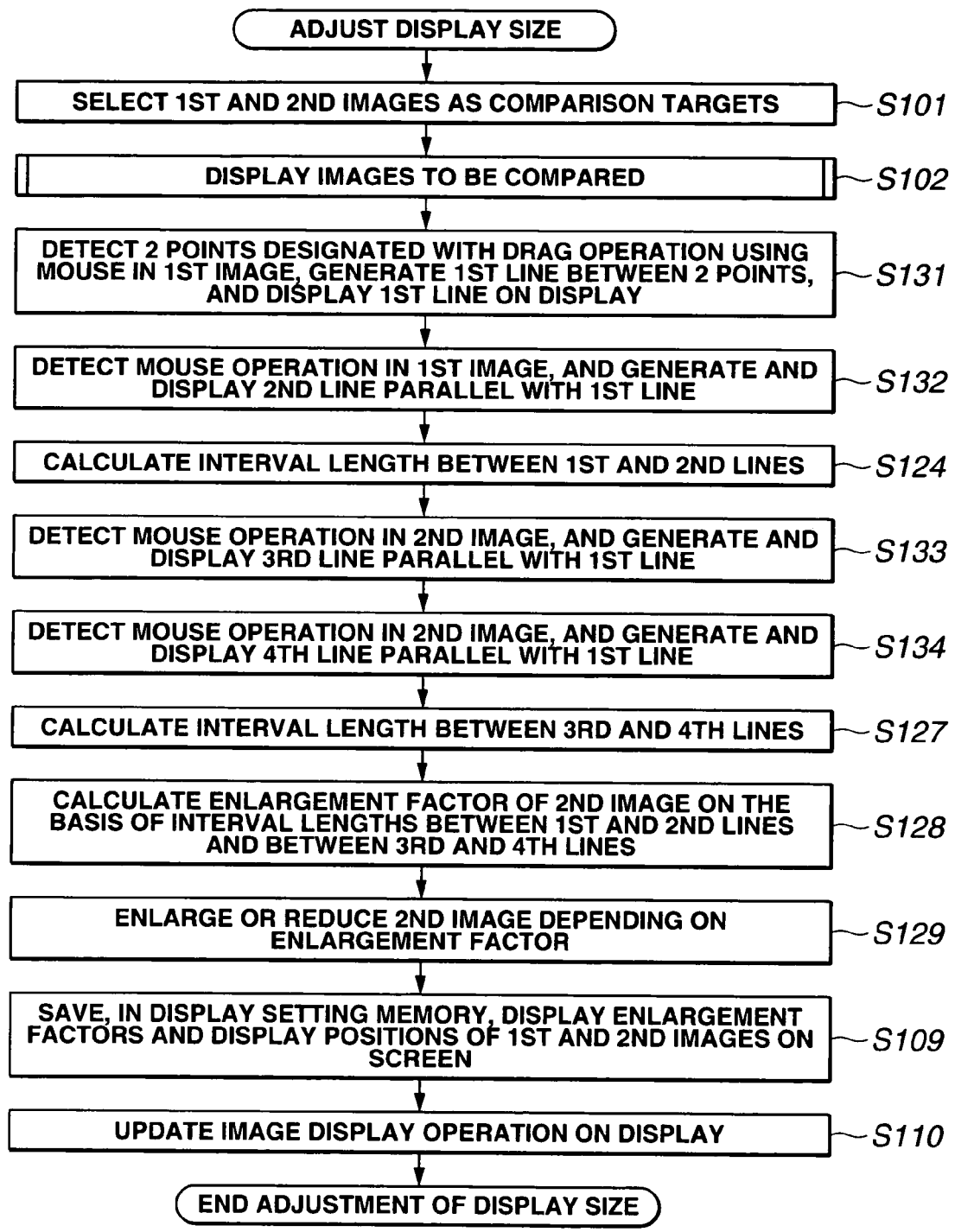
FIG. 21 is a flowchart showing the display size adjusting processing according to the fifth embodiment.

FIGS. 20A, 20B, and 21 show the fifth embodiment of the present invention, FIGS. 20A and 20B are explanatory diagrams of the operating sequence for setting the same size of the main object in images displayed in a plurality of display areas, and FIG. 21 is a flowchart showing the display size adjusting processing.

According to the fifth embodiment, the same portions as those according to the third and fourth embodiments are designated by the same reference numerals, a description thereof is omitted, and only different portions are mainly described.

According to the fifth embodiment, a description is given of an example in which the size of the main object of an image shown in FIG. 20B is smaller than an image shown in FIG. 20A.

The display size adjusting processing starts, and the processing in steps S101 and S102 is performed as mentioned above, thereby selecting the first image and the second image, serving as comparison targets, and displaying the selected first and second images on the display areas 112 and 113.

Thereafter, it is detected that the drag operation with a mouse is performed in one (the first image) of two display images and two points P1 and P2 are designated. Further, a first line L1 is generated between the two points P1 and P2 and is displayed on the display 104 (in step S131). Specifically, the pressing and dragging operation of the mouse button displays the line L1 passing through the two points including the position (point P1) of the mouse pointer upon pressing and dragging the mouse button and the position (point P2) of the mouse pointer that is being dragged. The releasing operation of the mouse button fixes the line L1 at the releasing position.

Subsequently, it is detected that the operation (e.g., clicking operation) with the mouse is performed at a point P3 in the first image. After that, the second line L2 parallel with the line L1, passing through the point P3, is generated and is displayed (in step S132).

In step S124, the distance (interval length) between the first line L1 and the second line L2 is calculated.

Subsequently, it is detected that the operation with the mouse is performed at the point Q1 in the other display image (the second image). The third line L3 parallel with the first line L1 is generated and is displayed (in step S133).

Similarly, it is detected that the operation with the mouse is performed at the point Q2 in the second image. A fourth line L4 parallel with the first line L1 is generated and is displayed (in step S134).

In step S127, the distance (interval length) between the third line L3 and the fourth line L4 is calculated.

Thereafter, the processing in steps S128 and S129 is performed. Further, the processing in steps S109 and S110 is performed and the display size adjusting processing ends. Note that the fixing sequence of the positions of the lines L2 to L4 is the same as the position fixing sequence of the line according to the fourth embodiment.

According to the fifth embodiment, the same advantages as those according to the third and fourth embodiments are obtained. Further, with only the simple operation by designating two parallel lines in the display image, a reference length can be set, as the distance between the two parallel lines. The object included in the two images can be observed with the same size. As a consequence thereof, a plurality of images can be preferably compared.

Further, the two parallel lines are designated as follows. That is, a first point and a second point are designated in a display image of a first image of a plurality of display images, thereby setting a first line passing through the first point and the second point. Subsequently, a third point is designated in the image, thereby setting a second line parallel with the first line, passing through the third point. Further, in the second image of the plurality of display images and an image subsequent thereto, two points are designated, and two lines parallel with the first line, passing through the two points, are set. Therefore, the operation is easy and a parallel line inclined to the display area can be set, and the inclined object can be changed in the same direction, thereby easily comparing the images.

Sixth Embodiment

Figure 22A:
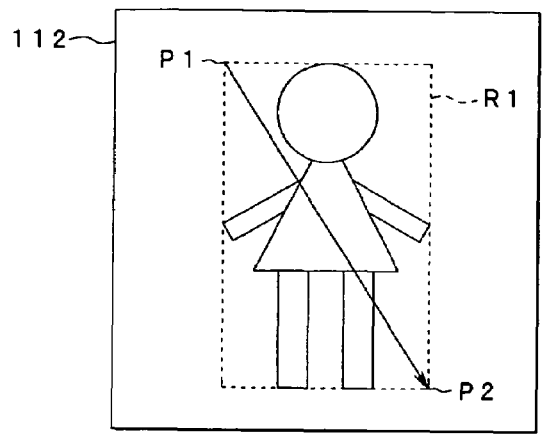
FIGS. 22A and 22B are explanatory diagrams for setting sizes of main objects to be substantially the same in images displayed in a plurality of display areas according to a sixth embodiment of the present invention.
Figure 22B:
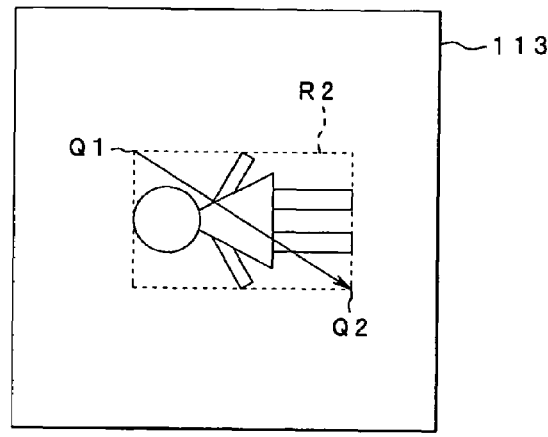
Figure 23:
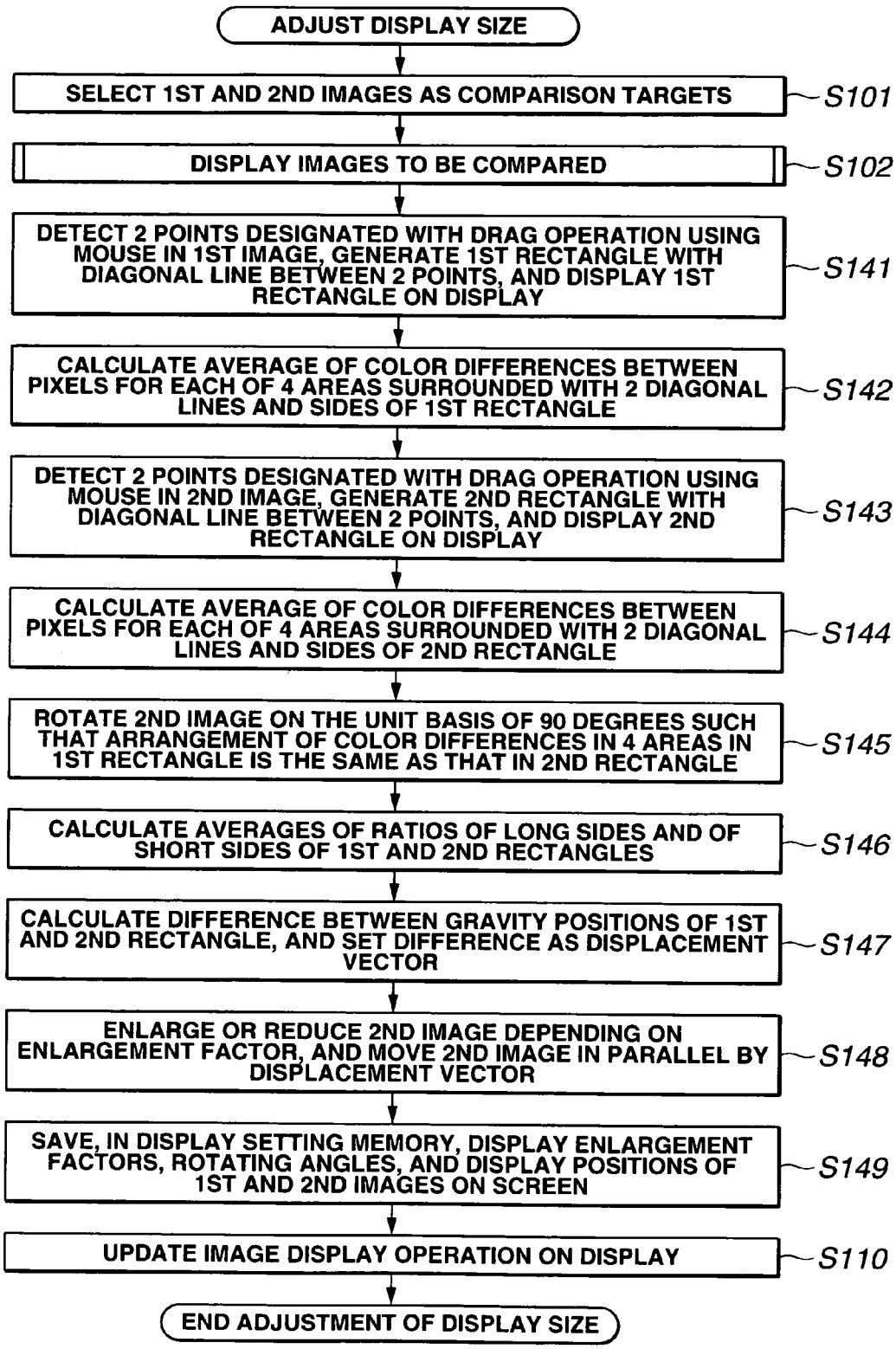
FIG. 23 is a flowchart showing the display size adjusting processing according to the sixth embodiment.
Figure 24A:
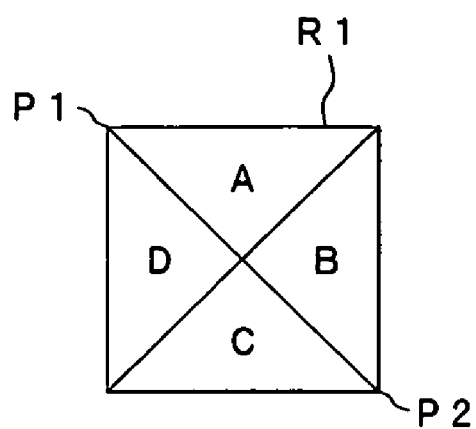
FIGS. 24A and 24B are diagrams showing the arrangement of four partial areas in rectangular regions displayed on a first image and a second image according to the sixth embodiment.
Figure 24B:
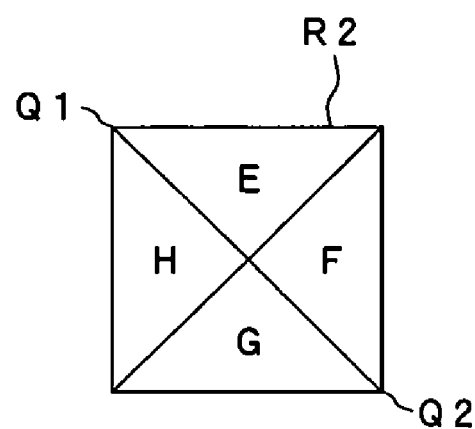

FIGS. 22A, 22B, 23, 24A, and 24B show the sixth embodiment of the present invention, FIGS. 22A and 22B are explanatory diagrams of the operating sequence for setting the same size of the main object in image in a plurality of display areas, FIG. 23 is a flowchart showing display size adjusting processing, and FIGS. 24A and 24B are diagrams showing the arrangement of four partial areas in rectangular regions displayed in a first image and a second image.

According to the sixth embodiment, the same portions as those according to the third to fifth embodiments are designated by the same reference numerals, a description thereof is omitted, and only different portions are mainly described.

According to the sixth embodiment, a description is given of an example in which the size of the main object of an image shown in FIG. 22B is smaller than an image shown in FIG. 22A, and an angle of the main object is varied on the unit basis of 90 degrees.

The display size adjusting processing starts, and the processing in steps S101 and S102 is performed as mentioned above, thereby selecting the first image and the second image, serving as comparison targets, and displaying the selected first and second images on the display areas 112 and 113.

Thereafter, it is detected that the drag operation with the mouse is performed in one of two display images (the first image) and that two points P1 and P2 are designated. A first rectangular region R1 with diagonal lines between the two points P1 and P2 and with the sides parallel with any of four sides of the display areas 112 and 113 is generated and is displayed on the display 104 (in step S141).

Subsequently, for four partial areas A, B, C, and D surrounded by the two diagonal lines and the four sides of the first rectangular region R1 (refer to FIG. 24A), an average of color differences between pixels in the partial area is calculated (in step S142). Herein, as for the color difference, attention is paid to one of Cr and Cb and, for only the color diffidence, to which attention is paid, processing for calculating the average among pixels is performed. A method for calculating the color differences Cr and Cb from RGB signals will be described later in step S145, as a subsequent step.

Subsequently, it is detected that the drag operation with the mouse is performed in the other display image (the second image) and that two points Q1 and Q2 are designated. A rectangular region R2 with diagonal lines between the two points Q1 and Q2 and with the sides parallel with any of four sides of the display areas 112 and 113 is generated and is displayed on the display 104 (in step S143).

For four partial areas E, F, G, and H surrounded by the two diagonal lines and the four sides of the second rectangular region R2 (refer to FIG. 24B), an average of color differences among the pixels in the partial area is calculated (in step S144).

Subsequently, the second image is rotated on the unit basis of 90 degrees so as to set the same arrangement (distribution) of the color difference to the four partial areas in the first rectangular region R1 and to the four partial areas in the second rectangular region R2 (in step S145).

Specifically, the processing in step S145 is performed as follows.

First, a sum (first sum) of absolute values of the difference between the averages of color differences in respective two partial areas is calculated. That is, the first sum is obtained by calculating the absolute value of the difference between the average of the color differences in the partial area A and the average of the color differences in the partial area E, the absolute value of the differences between the average of the color differences in the partial area B and the average of the color differences in the partial area F, the absolute value of the differences between the average of the color differences in the partial area C and the average of the color differences in the partial area G, and the absolute value of the differences between the average of the color differences in the partial area D and the average of the color differences in the partial area H.

Herein, a luminance Y, the color difference Cr, and the color difference Cb can be calculated from the RGB signals on the basis of the following Expression, as is well-known.

$$Y=0.299R+0.587G+0.114B$$

$$Cr=0.500R-0.419G-0.081B$$

$$Cb=-0.169R-0.332G+0.500B$$

Subsequently, a sum (second sum) of absolute values of the differences between the averages of color differences in respective two partial areas is calculated. That is, the second sum is obtained by calculating the absolute value of the difference between the average of the color differences in the partial area A and the average of the color differences in the partial area F, the absolute value of the difference between the average of the color differences in the partial area B and the average of the color differences in the partial area G, the absolute value of the difference between the average of the color differences in the partial area C and the average of the color differences in the partial area H, and the absolute value of the difference between the average of the color differences in the partial area D and the average of the color differences in the partial area E. The angle in this case corresponds to the case of rotating the second rectangular region R2 in the left direction at an angle of 90 degrees.

Similarly, a sum (third sum) of absolute values of the difference between the averages of color differences in respective two partial areas is calculated. That is, the third sum is obtained by calculating the absolute value of the difference between the average of the color differences in the partial area A and the average of the color differences in the partial area G, the absolute value of the difference between the average of the color differences in the partial area B and the average of the color differences in the partial area H, the absolute value of the difference between the average of the color differences in the partial area C and the average of the color differences in the partial area E, and the absolute value of the difference between the average of the color differences in the partial area D and the average of the color differences in the partial area F. The angle in this case corresponds to the case of rotating the second rectangular region R2 in the left direction at an angle of 180 degrees.

Further, a sum (fourth sum) of absolute values of the difference between the averages of color differences in respective two partial areas is calculated. That is, the fourth sum is obtained by calculating the absolute value of the difference between the average of the color differences in the partial area A and the average of the color differences in the partial area H, the absolute value of the difference between the average of the color differences in the partial area B and the average of the color differences in the partial area E, the absolute value of the difference between the average of the color differences in the partial area C and the average of the color differences in the partial area F, and the absolute value of the difference between the average of the color differences in the partial area D and the average of the color differences in the partial area G. The angle in this case corresponds to the case of rotating the second rectangular region R2 in the left direction at an angle of 270 degrees.

The angle corresponding to the minimum one of the first to fourth sums is calculated as the rotating angle of the second image.

Note that, when the difference with a predetermined value or more does not exist in the first to fourth sums, another color-difference is selected and the similar processing is performed.

Further, the color difference is used as color information. However, the present invention is not limited to this and another color-information may be used. Furthermore, luminance information can be used in place of the color difference and, alternatively, the luminance information may be used together with the color difference. By using the plurality of pieces of the information as mentioned above, the detecting precision can be improved.

Thereafter, a ratio (first ratio) between the long side of the first rectangular region R1 and the long side of the second rectangular region R2 is calculated. Similarly, a ratio (second ratio) between the short side of the first rectangular region R1 and the short side of the second rectangular region R2 is calculated. The average of the first ratio and the second ratio is calculated, and the calculated average is set as the enlargement factor (in step S146). Note that the average of the ratio between the long sides and the ratio between the short sides is set as the enlargement factor, however, any of the ratio between the long sides and the ratio between the short sides may be set as enlargement factor and, alternatively, the user may select one of the ratio between the long sides and the ratio between the short sides as the enlargement factor of the image.

Subsequently, the gravity position of the first rectangular region R1 and the gravity position of the second rectangular region R2 are calculated, and a difference vector between vectors of the gravity positions is set as a displacement vector (in step S147). The second image is enlarged or is reduced, depending on the enlargement factor, and is thereafter moved in parallel to itself by the displacement vector (in step S148).

The enlargement factors for display, the rotating angles, and the display positions on the screen of the first image and the second image are respectively stored in the display setting memory 102b (in step S149). The processing in step S110 is performed and the display size adjusting processing ends.

The color difference and the luminance are calculated for each of the four partial areas obtained by division of the rectangular region with the four sides and diagonal lines thereof and the correlation between the partial areas is investigated to find the same direction. However, the present invention is not limited to this, and the direction and the length, as references of the screen, may be automatically calculated by investigating the color difference and the luminance of the image in detail on the unit basis of a single pixel or a plurality of pixels and, alternatively, by recognizing the main object with an image recognizing technology.

According to the sixth embodiment, the same advantages as those according to the third to fifth embodiments are obtained. Further, with only the simple operation by designating one rectangular region in the display image, a reference length can be set on the basis of the lengths of the long side and the short side of the rectangular region, and further the object included in the two images with the same size can be observed. Thus, a plurality of images can be preferably compared.

In addition, the rotating angle of one image to another image is determined on the basis of the color distribution and the luminance distribution of the designated rectangular region, and the image is rotated. Therefore, the object included in the two images can be observed in the same direction. Thus, a plurality of images can be preferably compared.

In this case, the rotating angle on the unit basis of 90 degrees can be simply determined by extracting the color information and the luminance information for the four partial areas obtained by the division of the rectangular region with four sides and two diagonal lines thereof. Since the camera is used for photographing in the longitudinal direction and in the lateral direction in many cases, this is advantageous when the image in the longitudinal direction and the image in the lateral direction exist.

Seventh Embodiment

Figure 25A:
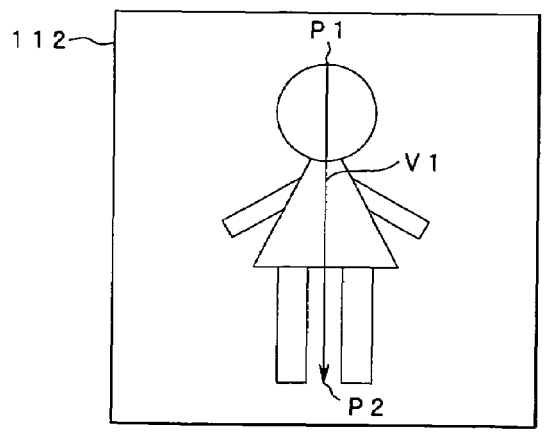
FIGS. 25A and 25B are explanatory diagrams of the operating sequence for setting sizes of main objects to be substantially the same in images displayed in a plurality of display areas according to the seventh embodiment of the present invention.
Figure 25B:
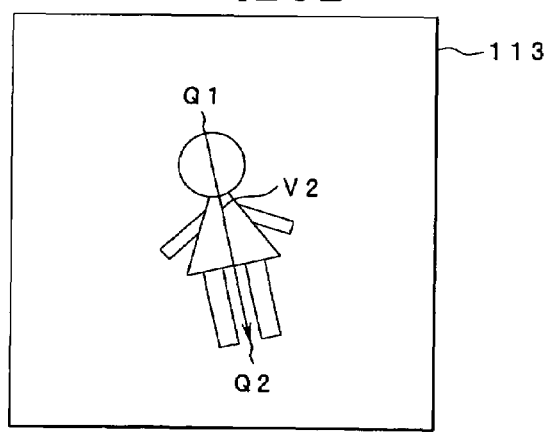
Figure 26:
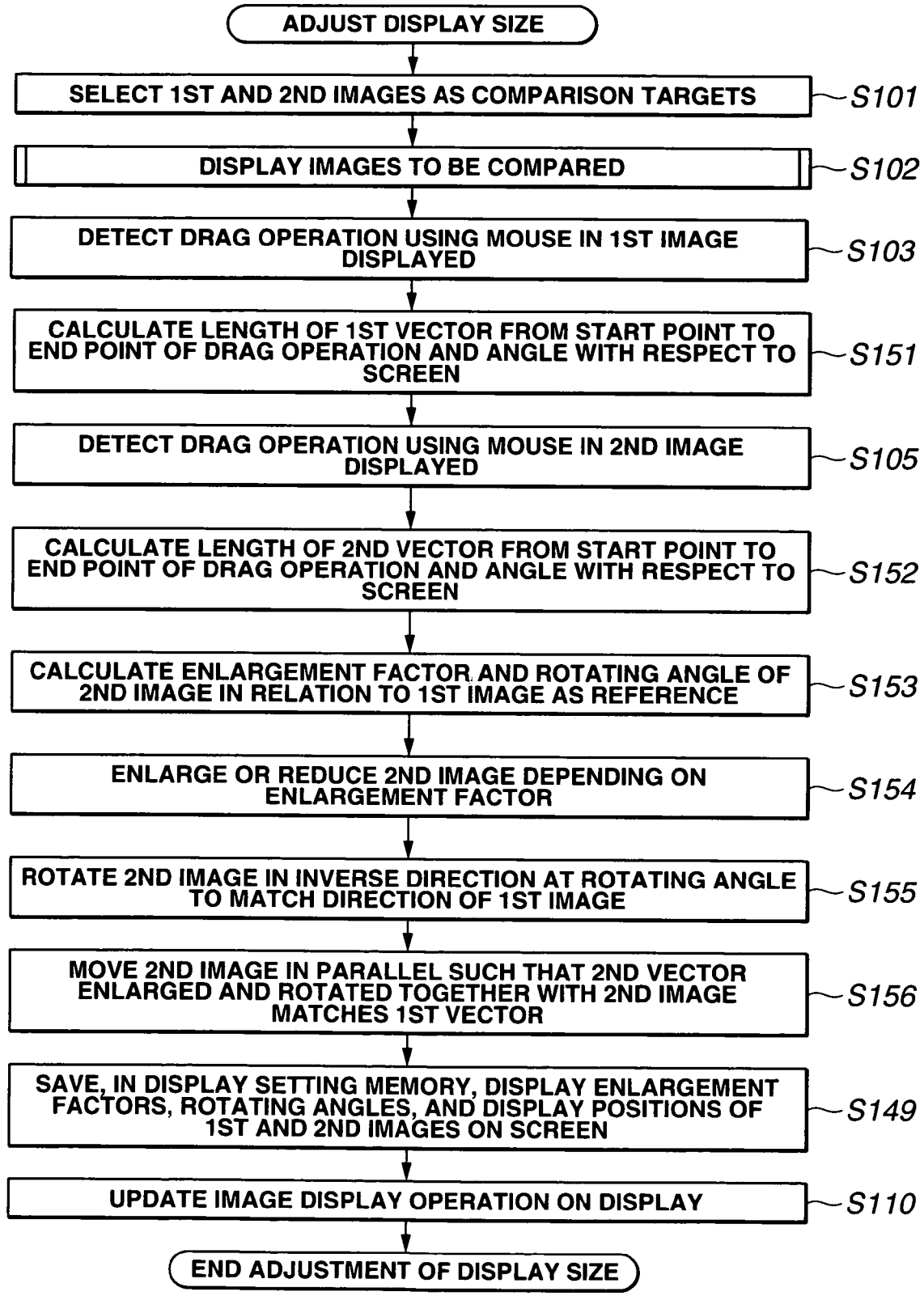
FIG. 26 is a flowchart showing the display size adjusting processing according to the seventh embodiment of the present invention.

FIGS. 25A, 25B and 26 show the seventh embodiment of the present invention, FIGS. 25A and 25B are explanatory diagrams of the operating sequence for setting the same size of the main object in images displayed in a plurality of display areas, and FIG. 26 is a flowchart showing the display size adjusting processing.

According to the seventh embodiment, the same portions as those according to the third to sixth embodiments are designated by the same reference numerals, a description thereof is omitted, and only different portions are mainly described.

According to the seventh embodiment, a description is given of an example in which the size of the main object of an image shown in FIG. 25B is small, in relation to an image shown in FIG. 25A and angles of the main object are different in the images as shown in FIGS. 25A and 25B.

The display size adjusting processing starts, and the processing in steps S101 to S103 is performed as mentioned above, thereby selecting the first image and the second image, serving as comparison targets, and displaying the selected first and second images on the display areas 112 and 113. The drag operation with the mouse or the like is detected in the first image.

Thereafter, a length and an angle on the screen of a first vector V1 from a start point P1 to an end point P2 of the drag operation are calculated (in step S151).

In step S105, the drag operation with the mouse is detected in the second image. After that, a length and an angle of a second vector V2 from a start point Q1 to an end point Q2 of the drag operation are calculated (in step S152).

Subsequently, an enlargement factor and a rotating angle of the second image, in accordance with the first image, as a reference, are calculated on the basis of the length and the angle of the second vector V2 in accordance with the first vector V1 (in step S153), and the second image is enlarged or is reduced, depending on the enlargement factor (in step S154).

The second image is rotated in the reverse direction by the rotating angle calculated in step S153, thereby matching the direction of the first image (in step S155).

Thereafter, the second image is moved in parallel to itself such that the second vector V2 obtained by enlarging and rotating the second image matches the first vector V1 (in step S156). The processing in steps S149 and S110 is performed and the display size adjusting processing ends.

According to the seventh embodiment, the same advantages according to the third to sixth embodiments are obtained. Further, with the simple operation by designating the first point and the second point in the display image enables the setting, the length of a line segment connecting the first point and the second point can be set as a reference length and also the direction from the first point to the second point can be set as a reference direction. Thus, the object included in the two images can be observed with the same size in the same direction. As a consequence thereof, a plurality of images can be preferably compared.

Eighth Embodiment

Figure 27A:
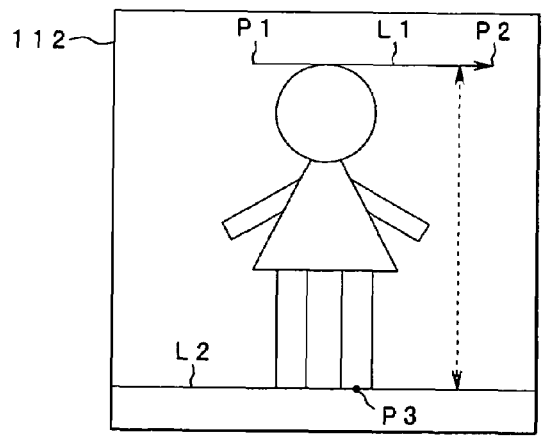
FIGS. 27A and 27B are explanatory diagrams of the operating sequence for setting sizes of main objects to be substantially the same in images displayed in a plurality of display areas according to the eighth embodiment of the present invention.
Figure 27B:
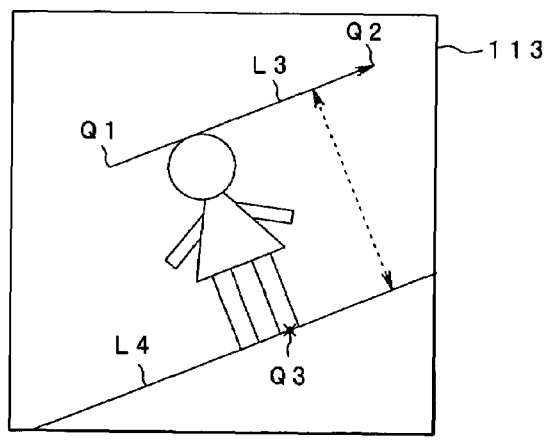
Figure 28:
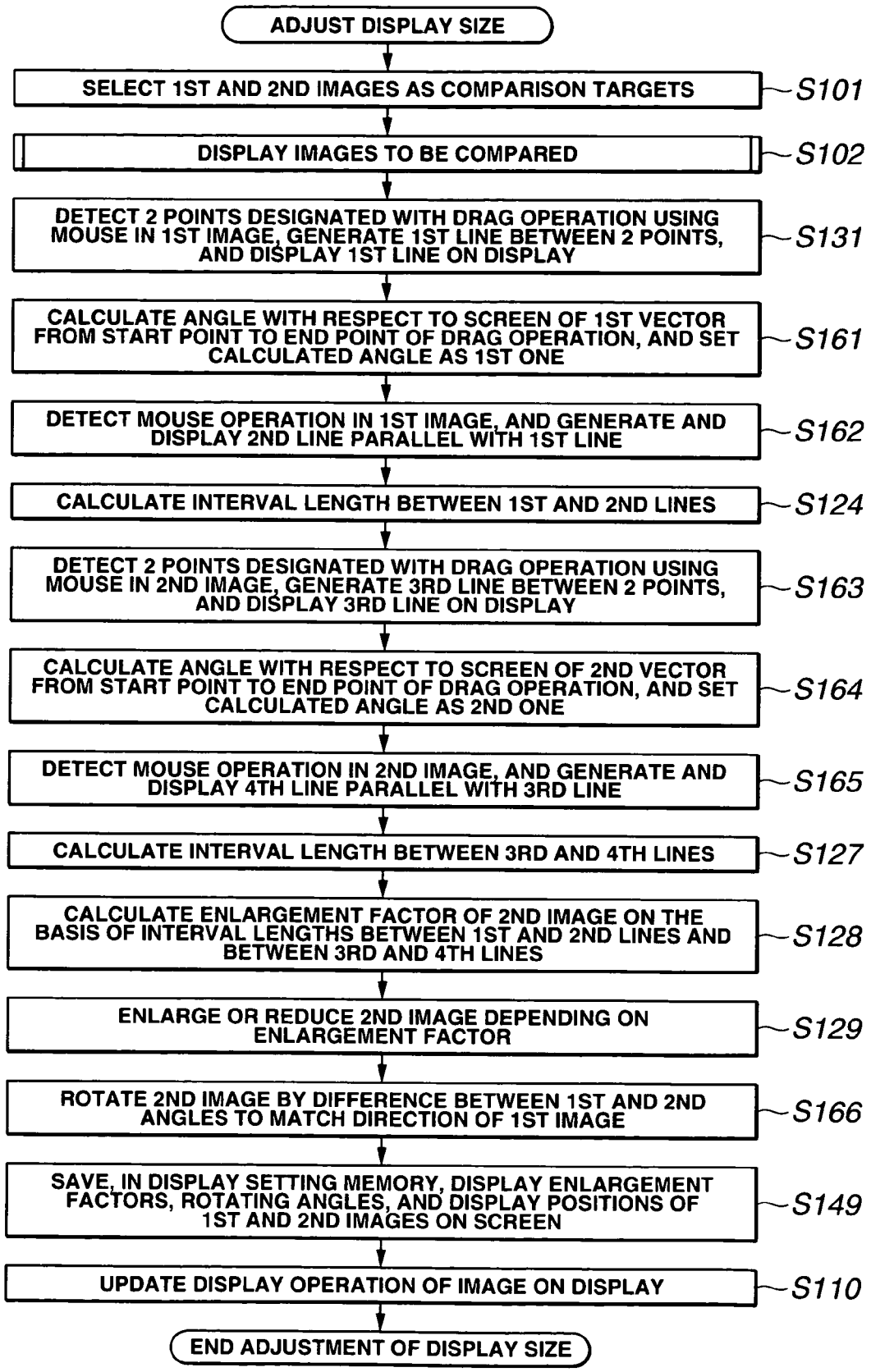
FIG. 28 is a flowchart showing the display size adjusting processing according to the eighth embodiment.

FIGS. 27A, 27B, and 28 show the eighth embodiment of the present invention, FIGS. 27A and 27B are explanatory diagrams of the operating sequence for setting the same size of the main object in the images in a plurality of display areas, and FIG. 28 is a flowchart showing the display size adjusting processing.

According to the eighth embodiment, the same portions as those according to the third to seventh embodiments are designated by the same reference numerals, a description thereof is omitted, and only different portions are mainly described.

According to the eighth embodiment, a description is given of an example in which the size of the main object of an image shown in FIG. 27B is smaller than an image shown in FIG. 27A and the angles of the main object are different in the images as shown in FIGS. 27A and 27B.

The display size adjusting processing starts, and the processing in steps S101, S102, and S131 is sequentially performed as mentioned above, thereby selecting the first image and the second image, serving as comparison targets, and displaying the selected first and the second images on the display areas 112 and 113. The two points P1 and P2 of the drag operation with the mouse in the first image are designated, a first line L1 is generated between the two points P1 and P2, and the first line L1 is displayed on the display 104.

Subsequently, the angle with respect to the screen of a first vector (corresponding to a vector of the first line L1) from the start point P1 to the end point P2 of the drag operation is calculated and is set, as a first angle (in step S161).

Then, the operation (e.g., click operation) with the mouse at a point P3 in the first image is detected, and a second line L2 parallel with the first line L1 is generated and is displayed (in step S162). In the processing in step S124, the distance (interval length) between the first line L1 and the second line L2 is calculated.

Thereafter, the two points Q1 and Q2 designation by the drag operation with the mouse in the second image is detected, a third line L3 is generated between the two points Q1 and Q2, and the third line L3 is displayed on the display 104 (in step S163).

Subsequently, an angle with respect to the screen of a second vector (corresponding to a vector of the third line L3) from the start point Q1 to the end point Q2 of the drag operation is calculated and is set, as a second angle (in step S164).

Then, the operation (e.g., click operation) with the mouse at the point Q3 in the second image is detected, and the fourth line L4 parallel with the third line L3 is generated and is displayed (in step S165).

Thereafter, in the processing in step S127, the distance (interval length) between the third line L3 and the fourth line L4 is calculated. Further, in the processing in step S128, the enlargement factor of the second image is calculated on the basis of the interval length between the first line L1 and the second line L2 and the interval length between the third line L3 and the fourth line L4. Furthermore, in the processing in step S129, the second image is enlarged or is reduced, depending on the enlargement factor.

Subsequently, the second image is rotated by an angle corresponding to the difference between the first angle and the second angle, thereby matching the direction of the second image to that of the first image (in step S166).

After that, the processing in steps S149 and S110 is performed and the display size adjusting processing ends.

According to the eighth embodiment, the same advantages as those according to the third to seventh embodiments are obtained. Further, with only the simple operation by designating the first point and the second point in the display image, the first line passing through the first point and the second point can be set, and also the direction from the first point to the second point can be set as a reference direction. Furthermore, with only the simple operation by designating the third point in the display image, the second line parallel with the first line and passing through the third point can be set, and also the distance between the first line and the second line can be set as a reference length. The object included in the two images can be observed with the same size in the same direction. Thus, a plurality of images can be preferably compared.

Obviously, the present invention is not limited to the above-described embodiments, and can be variously modified and applied without departing the essentials of the present invention.

What is claimed is:

1. An image display apparatus for displaying a plurality of images capable of being compared with each other on the basis of a plurality of pieces of image data obtained by photographing with the same or different photographing apparatuses, the image display apparatus comprising:

an image selecting unit that selects as display targets the plurality of pieces of image data;

an image geometric adjusting unit that geometrically adjusts the image displayed on the display on the basis of the image data selected by the image selecting unit; and a displaying control unit that displays, on the display, a plurality of images which are geometrically adjusted by the image geometric adjusting unit.

2. The image display apparatus according to claim 1, further comprising:

a photographing-information extracting unit that extracts photographing information associated with the image data selected by the image selecting unit, wherein the image geometric adjusting unit comprises a resizing unit that automatically enlarges or reduces the image on the display of the displaying control unit on the basis of the photographing information of the plurality of images with the same display size of the images on the display of the displaying control unit.

3. The image display apparatus according to claim 2, wherein, upon displaying the plurality of images on the same display or different displays with the same resolution, the photographing information substantially includes: the size in the longitudinal direction and/or in the lateral direction of an image pickup device in the photographing apparatus which has photographed the image, the number of pixels in the longitudinal direction and/or in the lateral direction of the image pickup device; the focusing distance of a lens of the photographing apparatus in the photographing, and the distance from the lens to an object.

4. The image display apparatus according to claim 2, wherein the resizing unit determines the size upon automatically enlarging or reducing the image with display information of the display.

5. The image display apparatus according to claim 4, wherein, upon displaying the plurality of images on different displays with different resolutions, the photographing information substantially includes: the size in the longitudinal direction and/or in the lateral direction of an image pickup device in the photographing apparatus which has photographed the image; the number of pixels in the longitudinal direction and/or in the lateral direction of the image pickup device; the focusing distance of a lens of the photographing apparatus in the photographing, and the distance from the lens to an object, and the display information substantially includes a display resolution in the longitudinal direction and/or in the lateral direction on the different displays.

6. The image display apparatus according to claim 2, wherein the image data and the photographing information associated with the image data are stored on the same image file.

7. The image display apparatus according to claim 6, further comprising:
an image storing unit that stores the image file,
wherein the photographing-information extracting unit extracts the photographing information from the image file stored on the image storing unit.

8. The image display apparatus according to claim 2, further comprising:
an image operating unit that performs image operation for a display image on the display; and
an image operation instructing unit that instructs image operation for one of the display images,
wherein the image operating unit performs interlockingly the image operation instructed by the image operation instructing unit with respect to all of a plurality of images displayed on the display.

9. The image display apparatus according to claim 8, wherein the image operating unit performs geometric operation of the image.

10. The image display apparatus according to claim 1, wherein the image is displayed in a display area set on a display screen of the display,
the image display apparatus further comprises a reference setting unit that sets a reference length every image displayed on the display area, and
the image geometric adjusting unit enlarges or reduces the image displayed in the display area such that the respective reference lengths set respectively to the plurality of images are to be the same length.

11. The image display apparatus according to claim 10, wherein the display image is displayed on the same display.

12. The image display apparatus according to claim 10, wherein the reference setting unit sets two points in the display image, thereby setting the reference length, as the distance between the two points.

13. The image display apparatus according to claim 10, wherein the reference setting unit designates a first line and a second line parallel with each other in the display image, thereby setting the reference length, as the distance between the parallel lines.

14. The image display apparatus according to claim 13, wherein the display area is rectangular, and
the reference setting unit designates a first point in the display image, thereby setting a line parallel with any of the sides of a rectangular boundary of the display area, as a first line, and the reference setting unit further designates a second point in the display image, thereby setting a line parallel with the first line, as a second line.

15. The image display apparatus according to claim 13, wherein the reference setting unit designates a first point and a second point in a display image of a first image in a plurality of images displayed on the display, thereby setting the first line passing through the two points, and the reference setting unit subsequently designates a third point in the image, thereby setting the second line passing through the third point and parallel with the first line, and the reference setting unit further designates two points in a second image and an image subsequent thereto of the plurality of display images, thereby setting two lines passing respectively through the two points and parallel with the first line of the first image.

16. The image display apparatus according to claim 10, wherein the reference setting unit designates a reference length and a reference direction, and
the image geometric adjusting unit has an image rotating section that rotates the display image on the display area so as to set the same direction of the reference directions set on the plurality of images.

17. The image display apparatus according to claim 16, wherein the reference setting unit designates a first point and a second point in the display image, thereby setting the distance between the first point and the second point, as the reference length, and setting the direction from the first point to the second point, as the reference direction.

18. The image display apparatus according to claim 16, wherein the reference setting unit designates a first point and a second point in the display image, thereby setting a first line passing through the first point and the second point and setting the direction from the first point to the second point, as the reference direction, and the reference setting unit further designates a third point in the display image, thereby setting a second line passing through the third point and parallel with the first line, and setting a second line parallel with the first line and setting the distance between the first line and the second line, as the reference length.

19. The image display apparatus according to claim 10, wherein the reference setting unit designates one rectangular region every display image, thereby designating the reference length on the basis of one of a long side and a short side of the rectangular region.

20. The image display apparatus according to claim 19, wherein the reference setting unit sets a reference direction on the basis of the designated rectangular region, in addition to the reference length, and
the image geometric adjusting unit has an image rotating section that rotates an image displayed on the display area such that the reference directions set to the plurality of images are equal to each other.

21. The image display apparatus according to claim 20, wherein the image geometric adjusting unit comprises:
a color/luminance distribution extracting section that extracts the distribution of at least one of a color and a luminance of the designated rectangular region; and
a rotating-angle determining section that determines a rotating angle of one image with respect to another image on the basis of the distribution extracted by the color/luminance distribution extracting section, and
the image rotating section rotates the other image by the angle detected by the rotating-angle determining section.

22. The image display apparatus according to claim 21, wherein the display area is rectangular, and the rectangular region has four sides parallel with any of four sides of the display area,
the color/luminance distribution extracting section extracts at least one of color information and luminance information for four partial areas obtained by dividing the rectangular region with four sides and two diagonal lines of the rectangular region, and
the rotating-angle determining section determines a rotating angle on the unit basis of 90 degrees, as the rotating angle, so as to set, to be the highest, the correlation between at least one of the color information and the luminance information for the four partial areas in the one image and at least one of the color information and the luminance information for the four partial areas in the other image.

23. An image display program for displaying, on a display, a plurality of images capable of being compared with each other on the basis of a plurality of pieces of image data obtained by photographing operation of the same photographing apparatus or different photographing apparatuses, the image display program comprising:
selecting the plurality of pieces of image data, as display targets;

geometrically adjusting the image displayed on the display on the basis of the selected image data; and displaying the plurality of geometrically-adjusted images on the display.

24. The image display program according to claim 23, further doing the following:

extracting photographing information associated with the selected image data, wherein the image is geometrically adjusted by automatically enlarging or reducing the image displayed on the display on the basis of the photographing information on the plurality of images so as to obtain substantially the same display size in the images displayed on the display.

25. The image display program according to claim 24, wherein, when the plurality of images are displayed on the same display or different displays with the same resolution, the photographing information substantially includes the size in the longitudinal direction and/or lateral direction of an image pickup device in the photographing apparatus that photographed the image, the number of pixels in the longitudinal direction and/or lateral direction of the image pickup device, the focusing distance in the photographing of a lens in the photographing apparatus, and the distance from the lens to an object.

26. The image display program according to claim 24, wherein the size in the automatic enlargement or reduction is determined with display information of the display.

27. The image display program according to claim 26, wherein, when the plurality of images are displayed on different displays with different resolutions, the photographing information substantially includes the size in the longitudinal direction and/or lateral direction of an image pickup device in the photographing apparatus that has photographed the image, the number of pixels in the longitudinal direction and/or lateral direction of the image pickup device, the focusing distance in the photographing of a lens of the photographing apparatus, and the distance from the lens to an object, and the display information substantially includes a display resolution in the longitudinal direction and/or lateral direction of each of the different displays.

28. The image display program according to claim 24, wherein the image data and the photographing information associated with the image data are stored on the same image file.

29. The image display program according to claim 28, wherein the image file is stored on an image storing unit, and, the photographing information is extracted from the image file stored on the image storing unit.

30. The image display program according to claim 24, wherein an instruction of image operation of one of images displayed on the display is detected, and the image operation instructed by the detected instruction of the image operation is interlockingly performed with respect to all the plurality of images displayed on the display.

31. The image display program according to claim 30, wherein the image operation is geometric operation for the image.

32. The image display program according to claim 23, wherein the image is displayed on a display area set on a display screen of the display, and a reference length is set every image displayed in the display area, and the image displayed on the display area is enlarged or is reduced such that the same reference length is set to the plurality of images.

33. The image display program according to claim 32, wherein the display images are displayed on the same display.

34. The image display program according to claim 32, wherein two points in the display image are set, thereby setting the distance between the two points as the reference length.

35. The image display program according to claim 32, wherein a first line and a second line parallel with each other are designated in the display image, thereby setting the distance between the parallel lines as the reference length.

36. The image display program according to claim 35, wherein the display area is rectangular, and a line parallel with any of sides of a rectangular border of the display area is set, as the first line, by designating a first point in the display image, and a line parallel with the first line is set, as the second line, by designating a second point in the image.

37. The image display program according to claim 35, wherein the first line passing through a first point and a second point is set by designating the two points in the display image of a first image of a plurality of images displayed on the display, the second line parallel with the first line, passing through a third point, is set by designating the third point in the image, and two lines parallel with the first line of the first image, passing through two points, are set by designating the two points in a second image or subsequent image thereto of the plurality of display images.

38. The image display program according to claim 32, wherein a reference direction is designated in addition to the reference length, and the image displayed in the display area is rotated such that the same reference direction is obtained in the plurality of images.

39. The image display program according to claim 38, wherein by designating a first point and a second point in the display image, the distance between the first point and the second point is set as the reference length, and a direction from the first point to the second point is set as the reference direction.

40. The image display program according to claim 38, wherein by designating a first point and a second point in the display image, a first line passing through the first point and the second point is set and the direction from the first point to the second point is set, as the reference direction, and by designating a third point in the display image, a second line passing through the third point and parallel with the first line is set and the distance between the first line and the second line is set as the reference length.

41. The image display program according to claim 32, wherein one rectangular region is designated every display image, thereby designating the reference length on the basis of at least one of a long side and a short side of the rectangular region.

42. The image display program according to claim 41, wherein a reference direction is set on the basis of the designated rectangular region, in addition to the reference length, and the image displayed in the display area is rotated such that the same reference direction is set to the plurality of images.

43. The image display program according to claim 42, wherein the distribution of at least one of a color and a luminance of the designated rectangular region is extracted, a rotating angle of one image with respect to another image is determined on the basis of the extracted distribution, and the other image is rotated by the determined angle.

44. The image display program according to claim 43, wherein the display area is rectangular and the rectangular region has four sides parallel with any of four sides of the display area, at least one of color information and luminance information is extracted for four partial areas obtained by dividing the rectangular region with the four sides and two diagonal lines of the rectangular region, and a rotating angle is determined on the unit basis of 90 degrees, as the rotating angle, so as to set, to be the highest, the correlation between at least one of the color information and the luminance information for the four partial areas in the one image and at least one of the color information and the luminance information for the four partial areas in the other image.

45. An image display method for displaying, on a display, a plurality of images capable of being compared with each other on the basis of a plurality of pieces of image data obtained by photographing with the same or different photographing apparatuses, the image display method comprising:

selecting the plurality of pieces of image data, as display targets;

geometrically adjusting the image displayed on the display on the basis of the selected image data; and displaying the plurality of geometrically-adjusted images on the display.

46. The image display method according to claim 45, further comprising:

extracting photographing information associated with the selected image data, and wherein the image is geometrically adjusted by automatically enlarging or reducing the image displayed on the display on the basis of the photographing information on the plurality of images so as to obtain substantially the same display size in the images displayed on the display.

47. The image display method according to claim 46, wherein, when the plurality of images are displayed on the same display or different displays with the same resolution, the photographing information substantially includes the size in the longitudinal direction and/or lateral direction of an image pickup device in the photographing apparatus that has photographed the image, the number of pixels in the longitudinal direction and/or lateral direction of the image pickup device, the focusing distance in the photographing of a lens in the photographing apparatus, and the distance from the lens to an object.

48. The image display method according to claim 46, wherein the size in the automatic enlargement or reduction is determined with display information on the display.

49. The image display method according to claim 48, wherein, when the plurality of images are displayed on different displays with different resolutions, the photographing information substantially includes the size in the longitudinal direction and/or lateral direction of an image pickup device in the photographing apparatus that has photographed the image, the number of pixels in the longitudinal direction and/or lateral direction of the image pickup device, the focusing distance in the photographing of a lens in the photographing apparatus, and the distance from the lens to an object, and the display information substantially includes a display resolution in the longitudinal direction and/or lateral direction of each of the different displays.

50. The image display method according to claim 46, wherein the image data and the photographing information associated with the image data are stored on the same image file.

51. The image display method according to claim 50, wherein the image file is stored on an image storing unit, and, the photographing information is extracted from the image file stored on the image storing unit.

52. The image display method according to claim 46, wherein an instruction of image operation of one of images displayed on the display is detected, and the image operation instructed by the detected instruction of the image operation is interlockingly performed with respect to all the plurality of images displayed on the display.

53. The image display method according to claim 52, wherein the image operation is geometric operation of the image.

54. The image display method according to claim 45, wherein the image is displayed on a display area set on a display screen of the display, a reference length is set every image displayed in the display area, and each of the images displayed on the display area is enlarged or is reduced so as to set the same reference length is obtained in the plurality of images.

55. The image display method according to claim 54, wherein the display images are displayed on the same display.

56. The image display method according to claim 54, wherein two points in the display image are set, thereby setting the distance between the two points as the reference length.

57. The image display method according to claim 54, wherein a first line and a second line parallel with each other are designated in the display image, thereby setting the distance between the parallel lines as the reference length.

58. The image display method according to claim 57, wherein the display area is rectangular, and a line parallel with any of sides of a rectangular border of the display area is set, as the first line, by designating a first point in the display image, and a line parallel with the first line is set, as the second line, by designating a second point in the image.

59. The image display method according to claim 57, wherein by designating two points in the display image of a first image of a plurality of images displayed on the display, a first line passing through the first point and the second point is set; by designating a third point in the image, the second line passing through a third point and parallel with the first line is set; and by designating two points in a second image or subsequent image thereto of the plurality of display images, two lines passing respectively through the two points and parallel with the first line of the first image are set.

60. The image display method according to claim 54, wherein a reference direction is designated in addition to the reference length, and the image displayed in the display area is rotated such that the same reference direction is set to the plurality of images.

61. The image display method according to claim 60, wherein by designating a first point and a second point in the display image, the distance between the first point and the second point is set as the reference length, and a direction from the first point to the second point is set as the reference direction.

62. The image display method according to claim 60, wherein by designating a first point and a second point in the display image, a first line passing through the first point and the second point is set and the direction from the first point to the second point is set, as the reference direction, and by designating a third point in the display image, a second line passing through the third point and parallel with the first line is set and the distance between the first line and the second line is set as the reference length.

63. The image display method according to claim 54, wherein one rectangular region is designated every display image, thereby designating the reference length on the basis of at least one of a long side and a short side of the rectangular region.

64. The image display method according to claim 63, wherein a reference direction, in addition to the reference length, is set on the basis of the designated rectangular region and the image displayed in the display area is rotated so as to set the same reference direction is obtained in the plurality of images.

65. The image display method according to claim 64, wherein the distribution of at least one of a color and a luminance of the designated rectangular region is extracted, a rotating angle of one image with respect to another image is determined on the basis of the extracted distribution, and the other image is rotated by the determined angle.

66. The image display method according to claim 65, wherein the display area is rectangular and the rectangular region has four sides parallel with any of four sides of the display area, at least one of color information and luminance information is extracted for four partial areas obtained by dividing the rectangular region with the four sides and two diagonal lines of the rectangular region, and a rotating angle is determined on the unit basis of 90 degrees, as the rotating angle, so as to set, to be the highest, the correlation between at least one of the color information and the luminance information for the four partial areas in the one image and at least one of the color information and the luminance information for the four partial areas in the other image.

67. A computer-readable storage medium, having stored thereon image display program instructions which, when executed, display, on a display, a plurality of images capable of being compared with each other on the basis of a plurality of pieces of image data obtained by photographing with the same or different photographing apparatuses, and perform a method comprising:

selecting the plurality of pieces of image data, as display targets;

geometrically adjusting the image displayed on the display on the basis of the selected image data; and displaying the plurality of geometrically-adjusted images on the display.

68. The computer-readable storage medium of claim 67, wherein the method performed further comprises:

extracting photographing information associated with the selected image data, wherein the image is geometrically adjusted by automatically enlarging or reducing the image displayed on the display on the basis of the photographing information on the plurality of images so as to set substantially the same display size to the images displayed on the display.

69. The computer-readable storage medium of claim 68, wherein, when the plurality of images are displayed on the same display or different displays with the same resolution, the photographing information substantially includes the size in the longitudinal direction and/or lateral direction of an image pickup device in the photographing apparatus that has photographed the image, the number of pixels in the longitudinal and/or lateral direction of the image pickup device, the focusing distance in the photographing of a lens in the photographing apparatus, and the distance from the lens to an object.

70. The computer-readable storage medium of claim 68, wherein the size in the automatic enlargement or reduction is determined with display information of the display.

71. The computer-readable storage medium of claim 70, wherein, when the plurality of images are displayed on different displays with different resolutions, the photographing information substantially includes the size in the longitudinal direction and/or lateral direction of an image pickup device in the photographing apparatus that has photographed the image, the number of pixels in the longitudinal direction and/or lateral direction of the image pickup device, the focusing distance in the photographing of a lens in the photographing apparatus, and the distance from the lens to an object, and the display information substantially includes a display resolution in the longitudinal direction and/or lateral direction of the different displays.

72. The computer-readable storage medium of claim 68, wherein the image data and the photographing information associated with the image data are stored on the same image file.

73. The computer-readable storage medium of claim 72, wherein the image file is stored on an image storing unit, and, the photographing information is extracted from the image file stored on the image storing unit.

74. The computer-readable storage medium of claim 68, wherein an instruction of image operation of one of images displayed on the display is detected, and the image operation instructed by the detected instruction of the image operation is interlockingly performed with respect to all the plurality of images displayed on the display.

75. The computer-readable storage medium of claim 74, wherein the image operation is geometric operation of the image.

76. The computer-readable storage medium of claim 67, wherein the image is displayed on a display area set on a display screen of the display, a reference length is set every image displayed in the display area, and each of the images displayed on the display area is enlarged or is reduced so as to obtain the same reference length in the plurality of images.

77. The computer-readable storage medium of claim 76, wherein the display images are displayed on the same display.

78. The computer-readable storage medium of claim 76, wherein two points in the display image are set, thereby setting the distance between the two points as the reference length.

79. The computer-readable storage medium of claim 76, wherein a first line and a second line parallel with each other are designated in the display image, thereby setting the distance between the parallel lines as the reference length.

80. The computer-readable storage medium of claim 79, wherein the display area is rectangular, and a line parallel with any of sides of a rectangular border of the display area is set, as the first line, by designating a first point in the display image, and a line parallel with the first line is set, as the second line, by designating a second point in the image.

81. The computer-readable storage medium of claim 79, wherein by designating two points in the display image of a first image of a plurality of images displayed on the display, a first line passing through the first point and the second point is set; by designating a third point in the image, the second line passing through a third point and parallel with the first line is set; and by designating two points in a second image or subsequent image thereto of the plurality of display images, two lines passing respectively through the two points and parallel with the first line of the first image are set.

82. The computer-readable storage medium of claim 76, wherein a reference direction is designated in addition to the reference length, and the image displayed in the display area is rotated so as to obtain the same reference direction in the plurality of images.

83. The computer-readable storage medium of claim 82, wherein by designating a first point and a second point in the display image, the distance between the first point and the second point is set as the reference length, and a direction from the first point to the second point is set as the reference direction.

84. The computer-readable storage medium of claim 82, wherein by designating a first point and a second point in the display image, a first line passing through the first point and the second point is set and the direction from the first point to the second point is set, as the reference direction, and by designating a third point in the display image, a second line passing through the third point and parallel with the first line is set and the distance between the first line and the second line is set as the reference length.

85. The computer-readable storage medium of claim 76, wherein one rectangular region is designated every display image, thereby designating the reference length on the basis of at least one of a long side and a short side of the rectangular region.

86. The computer-readable storage medium of claim 85, wherein a reference direction is set on the basis of the designated rectangular region, in addition to the reference length, and the image displayed on the display area is rotated so as to obtain the same reference direction in the plurality of images.

87. The computer-readable storage medium of claim 86, wherein the distribution of at least one of a color and a luminance of the designated rectangular region is extracted, a rotating angle of one image to another image is determined on the basis of the extracted distribution, and the other image is rotated by the determined angle.

88. The computer-readable storage medium of claim 87, wherein the display area is rectangular and the rectangular region has four sides parallel with any of four sides of a display area, at least one of color information and luminance information is extracted for four partial areas obtained by dividing the rectangular region with the four sides and two diagonal lines of the rectangular region, and a rotating angle is determined on the unit basis of 90 degrees, as the rotating angle, so as to set, to be the highest, the correlation between at least one of the color information and the luminance information for the four partial areas in the one image and at least one of the color information and the luminance information for the four partial areas in the other image.

* * * * *